(12) United States Patent
Newnham et al.

(10) Patent No.: US 11,989,476 B2
(45) Date of Patent: May 21, 2024

(54) SYSTEMS AND METHODS FOR REMOTELY MONITORING ELECTRONIC DISPLAYS

(71) Applicant: Manufacturing Resources International, Inc., Alpharetta, GA (US)

(72) Inventors: Elliot Newnham, Alpharetta, GA (US); Brock Bearchell, Alpharetta, GA (US); William Dunn, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 18/125,694

(22) Filed: Mar. 23, 2023

(65) Prior Publication Data

US 2023/0229373 A1 Jul. 20, 2023

Related U.S. Application Data

(63) Continuation of application No. 17/974,361, filed on Oct. 26, 2022, now Pat. No. 11,645,029, which is a
(Continued)

(51) Int. Cl.
*G06F 3/14* (2006.01)
*H04L 43/06* (2022.01)

(52) U.S. Cl.
CPC ............... *G06F 3/14* (2013.01); *H04L 43/06* (2013.01)

(58) Field of Classification Search
CPC .... G06F 3/04883; G06F 3/04845; G06F 3/20; G06F 3/14; G06K 9/222; H04L 43/06
(Continued)

(56) References Cited

U.S. PATENT DOCUMENTS

| 5,162,785 A | 11/1992 | Fagard |
| 5,351,201 A | 9/1994 | Harshbarger, Jr. et al. |

(Continued)

FOREIGN PATENT DOCUMENTS

| AU | 2016321400 B2 | 9/2019 |
| CN | 203277867 U | 11/2013 |

(Continued)

OTHER PUBLICATIONS

Photo Research, Inc., PRO-650 SpectraScan® Colorimeter, 1999, 2 pages.

(Continued)

*Primary Examiner* — Mark Edwards

(74) *Attorney, Agent, or Firm* — Standley Law Group LLP; Jeffrey S. Standley; Adam J. Smith

(57) ABSTRACT

Systems and methods for remotely monitoring display assemblies are provided. Each of the electronic display assemblies includes sensors in electronic communication with a controller, which is in electronic communication with a network communication device. At a monitoring center, different customer identifiers are associated with different portions of data, a particular customer identifier is received from a customer device, the portions of the data associated with the particular customer identifier are identified for transmission to the customer device, and one or more user displays are generated with the identified data.

19 Claims, 21 Drawing Sheets

Related U.S. Application Data continuation-in-part of application No. 17/893,253, filed on Aug. 23, 2022, now Pat. No. 11,614,911, which is a continuation of application No. 17/548,698, filed on Dec. 13, 2021, now Pat. No. 11,455,138, which is a continuation of application No. 17/134,634, filed on Dec. 28, 2020, now Pat. No. 11,243,733, which is a continuation of application No. 16/508,877, filed on Jul. 11, 2019, now Pat. No. 10,908,863.

(60) Provisional application No. 62/697,016, filed on Jul. 12, 2018.

(58) Field of Classification Search
USPC .......................................................... 345/2.1
See application file for complete search history.

(56) References Cited

U.S. PATENT DOCUMENTS

| | | | |
|---|---|---|---|
| 5,590,831 A | 1/1997 | Manson et al. | |
| 5,751,346 A | 5/1998 | Dozier et al. | |
| 5,786,801 A | 7/1998 | Ichise | |
| 5,952,992 A | 9/1999 | Helms | |
| 6,144,359 A | 11/2000 | Grave | |
| 6,157,143 A | 12/2000 | Bigio et al. | |
| 6,215,411 B1 | 4/2001 | Gothard | |
| 6,222,841 B1 | 4/2001 | Taniguchi | |
| 6,259,492 B1 | 7/2001 | Imoto et al. | |
| 6,384,736 B1 | 5/2002 | Gothard | |
| 6,421,694 B1 | 7/2002 | Nawaz et al. | |
| 6,509,911 B1 | 1/2003 | Shimotono | |
| 6,546,294 B1 | 4/2003 | Kelsey et al. | |
| 6,553,336 B1 | 4/2003 | Johnson et al. | |
| 6,556,258 B1 | 4/2003 | Yoshida et al. | |
| 6,587,525 B2 | 7/2003 | Jeong et al. | |
| 6,701,143 B1 | 3/2004 | Dukach et al. | |
| 6,753,842 B1 | 6/2004 | Williams et al. | |
| 6,771,795 B1 | 8/2004 | Isnardi | |
| 6,812,851 B1 | 11/2004 | Dukach et al. | |
| 6,850,209 B2 | 2/2005 | Mankins et al. | |
| 6,968,375 B1 | 11/2005 | Brown | |
| 7,038,186 B2 | 5/2006 | De Brabander et al. | |
| 7,064,672 B2 | 6/2006 | Gothard | |
| 7,319,862 B1 | 1/2008 | Lincoln et al. | |
| 7,330,002 B2 | 2/2008 | Joung | |
| 7,369,058 B2 | 5/2008 | Gothard | |
| 7,380,265 B2 | 5/2008 | Jensen et al. | |
| 7,391,317 B2 | 6/2008 | Abraham et al. | |
| 7,451,332 B2 | 11/2008 | Culbert et al. | |
| 7,474,294 B2 | 1/2009 | Leo et al. | |
| 7,516,223 B2 | 4/2009 | Whitehead | |
| 7,577,458 B2 | 8/2009 | Lin | |
| 7,581,094 B1 | 8/2009 | Apostolopoulos et al. | |
| 7,595,785 B2 | 9/2009 | Jang | |
| 7,612,278 B2 | 11/2009 | Sitrick et al. | |
| 7,614,065 B2 | 11/2009 | Weissmueller, Jr. et al. | |
| 7,636,927 B2 | 12/2009 | Zigmond et al. | |
| 7,675,862 B2 | 3/2010 | Pham et al. | |
| 7,751,813 B2 | 7/2010 | Varanda | |
| 7,764,280 B2 | 7/2010 | Shiina | |
| 7,774,633 B1 | 8/2010 | Harrenstien et al. | |
| 7,795,821 B2 | 9/2010 | Jun | |
| 7,889,852 B2 | 2/2011 | Whitehead | |
| 7,949,893 B1 | 5/2011 | Knaus et al. | |
| 8,212,921 B2 | 7/2012 | Yun | |
| 8,218,812 B2 | 7/2012 | Sugimoto et al. | |
| 8,248,203 B2 | 8/2012 | Hanwright et al. | |
| 8,441,574 B2 | 5/2013 | Dunn et al. | |
| 8,601,252 B2 | 12/2013 | Mendelow et al. | |
| 8,612,608 B2 | 12/2013 | Whitehead | |
| 8,654,302 B2 | 2/2014 | Dunn et al. | |
| 8,689,343 B2 | 4/2014 | De Laet | |
| 8,767,165 B2 | 7/2014 | Dunn | |
| 8,854,595 B2 | 10/2014 | Dunn | |
| 8,983,385 B2 | 3/2015 | Macholz | |
| 9,026,686 B2 | 5/2015 | Dunn et al. | |
| 9,812,047 B2 | 11/2017 | Schuch et al. | |
| 10,120,498 B2 | 11/2018 | Gray | |
| 10,170,076 B2 | 1/2019 | Wang et al. | |
| 10,296,108 B2 | 5/2019 | Gray et al. | |
| 10,325,536 B2 | 6/2019 | Schuch et al. | |
| 10,353,785 B2 | 7/2019 | Dunn et al. | |
| 10,593,175 B1* | 3/2020 | Jennings | G08B 13/19669 |
| 10,908,863 B2 | 2/2021 | Newnham et al. | |
| 11,093,355 B2 | 8/2021 | Dunn et al. | |
| 11,137,847 B2 | 10/2021 | Dunn | |
| 11,243,733 B2 | 2/2022 | Newnham et al. | |
| 11,402,940 B2 | 8/2022 | Dunn | |
| 11,455,138 B2 | 9/2022 | Newnham et al. | |
| 11,614,911 B2 | 3/2023 | Newnham et al. | |
| 11,644,921 B2 | 5/2023 | Dunn | |
| 11,645,029 B2 | 5/2023 | Newnham et al. | |
| 2002/0019933 A1 | 2/2002 | Friedman et al. | |
| 2002/0026354 A1 | 2/2002 | Shoji et al. | |
| 2002/0065046 A1 | 5/2002 | Mankins et al. | |
| 2002/0112026 A1 | 8/2002 | Fridman et al. | |
| 2002/0120721 A1 | 8/2002 | Eilers et al. | |
| 2002/0147648 A1 | 10/2002 | Fadden et al. | |
| 2002/0152425 A1 | 10/2002 | Chaiken et al. | |
| 2002/0163513 A1 | 11/2002 | Tsuji | |
| 2002/0163916 A1 | 11/2002 | Oskouy et al. | |
| 2002/0164962 A1 | 11/2002 | Mankins et al. | |
| 2002/0190972 A1 | 12/2002 | Ven de Van | |
| 2002/0194365 A1 | 12/2002 | Jammes | |
| 2002/0194609 A1 | 12/2002 | Tran | |
| 2003/0031128 A1 | 2/2003 | Kim et al. | |
| 2003/0039312 A1 | 2/2003 | Horowitz et al. | |
| 2003/0061316 A1 | 3/2003 | Blair et al. | |
| 2003/0097497 A1 | 5/2003 | Esakov | |
| 2003/0098881 A1 | 5/2003 | Nolte et al. | |
| 2003/0115591 A1 | 6/2003 | Weissmueller, Jr. et al. | |
| 2003/0117714 A1 | 6/2003 | Nakamura et al. | |
| 2003/0161354 A1 | 8/2003 | Bader et al. | |
| 2003/0177269 A1 | 9/2003 | Robinson et al. | |
| 2003/0192060 A1 | 10/2003 | Levy | |
| 2003/0196208 A1 | 10/2003 | Jacobson | |
| 2003/0214242 A1 | 11/2003 | Berg-Johansen | |
| 2003/0230991 A1 | 12/2003 | Muthu et al. | |
| 2004/0036697 A1 | 2/2004 | Kim et al. | |
| 2004/0138840 A1 | 7/2004 | Wolfe | |
| 2004/0158872 A1 | 8/2004 | Kobayashi | |
| 2004/0194131 A1 | 9/2004 | Ellis et al. | |
| 2004/0243940 A1 | 12/2004 | Lee et al. | |
| 2004/0252400 A1 | 12/2004 | Blank et al. | |
| 2004/0253947 A1 | 12/2004 | Phillips et al. | |
| 2005/0033840 A1 | 2/2005 | Nisani et al. | |
| 2005/0070335 A1 | 3/2005 | Jitsuishi et al. | |
| 2005/0071252 A1 | 3/2005 | Henning et al. | |
| 2005/0073518 A1 | 4/2005 | Bontempi | |
| 2005/0088984 A1 | 4/2005 | Chin et al. | |
| 2005/0123001 A1 | 6/2005 | Craven et al. | |
| 2005/0132036 A1 | 6/2005 | Jang et al. | |
| 2005/0179554 A1 | 8/2005 | Lu | |
| 2005/0184983 A1 | 8/2005 | Brabander et al. | |
| 2005/0216939 A1 | 9/2005 | Corbin | |
| 2005/0231457 A1 | 10/2005 | Yamamoto et al. | |
| 2005/0267943 A1 | 12/2005 | Castaldi et al. | |
| 2005/0289061 A1 | 12/2005 | Kulakowski et al. | |
| 2005/0289588 A1 | 12/2005 | Kinnear | |
| 2006/0007107 A1 | 1/2006 | Ferguson | |
| 2006/0022616 A1 | 2/2006 | Furukawa et al. | |
| 2006/0150222 A1 | 7/2006 | McCafferty et al. | |
| 2006/0160614 A1 | 7/2006 | Walker et al. | |
| 2006/0269216 A1 | 11/2006 | Wiemeyer et al. | |
| 2007/0039028 A1 | 2/2007 | Bar | |
| 2007/0154060 A1 | 7/2007 | Sun | |
| 2007/0157260 A1 | 7/2007 | Walker | |
| 2007/0168539 A1 | 7/2007 | Day | |
| 2007/0200513 A1 | 8/2007 | Ha et al. | |
| 2007/0214812 A1 | 9/2007 | Wagner et al. | |
| 2007/0237636 A1 | 10/2007 | Hsu | |
| 2007/0268241 A1 | 11/2007 | Nitta et al. | |
| 2007/0273519 A1 | 11/2007 | Ichikawa et al. | |

(56) References Cited

U.S. PATENT DOCUMENTS

| | | |
|---|---|---|
| 2007/0274400 A1 | 11/2007 | Murai et al. |
| 2007/0286107 A1 | 12/2007 | Singh et al. |
| 2007/0291198 A1 | 12/2007 | Shen |
| 2008/0008471 A1 | 1/2008 | Dress |
| 2008/0019147 A1 | 1/2008 | Erchak et al. |
| 2008/0024268 A1 | 1/2008 | Wong et al. |
| 2008/0034205 A1 | 2/2008 | Alain et al. |
| 2008/0037466 A1 | 2/2008 | Ngo et al. |
| 2008/0037783 A1 | 2/2008 | Kim et al. |
| 2008/0055297 A1 | 3/2008 | Park |
| 2008/0096559 A1 | 4/2008 | Phillips et al. |
| 2008/0104631 A1 | 5/2008 | Krock et al. |
| 2008/0111958 A1 | 5/2008 | Kleverman et al. |
| 2008/0112601 A1 | 5/2008 | Warp |
| 2008/0136770 A1 | 6/2008 | Peker et al. |
| 2008/0163291 A1 | 7/2008 | Fishman et al. |
| 2008/0185976 A1 | 8/2008 | Dickey et al. |
| 2008/0218501 A1 | 9/2008 | Diamond |
| 2008/0246871 A1 | 10/2008 | Kupper et al. |
| 2008/0266554 A1 | 10/2008 | Sekine et al. |
| 2008/0267328 A1 | 10/2008 | Ianni et al. |
| 2008/0278099 A1 | 11/2008 | Bergfors et al. |
| 2008/0281165 A1 | 11/2008 | Rai et al. |
| 2008/0303918 A1 | 12/2008 | Keithley |
| 2008/0313691 A1 | 12/2008 | Cholas et al. |
| 2009/0009997 A1 | 1/2009 | Sanfilippo et al. |
| 2009/0015400 A1 | 1/2009 | Breed |
| 2009/0036190 A1 | 2/2009 | Brosnan et al. |
| 2009/0079416 A1 | 3/2009 | Vinden et al. |
| 2009/0104989 A1 | 4/2009 | Williams et al. |
| 2009/0129556 A1 | 5/2009 | Ahn |
| 2009/0152445 A1 | 6/2009 | Gardner, Jr. |
| 2009/0164615 A1 | 6/2009 | Akkanen |
| 2009/0273568 A1 | 11/2009 | Milner |
| 2009/0315867 A1 | 12/2009 | Sakamoto et al. |
| 2010/0017526 A1 | 1/2010 | Jagannath et al. |
| 2010/0037274 A1 | 2/2010 | Meuninck et al. |
| 2010/0060550 A1 | 3/2010 | McGinn et al. |
| 2010/0083305 A1 | 4/2010 | Acharya et al. |
| 2010/0149567 A1 | 6/2010 | Kanazawa et al. |
| 2010/0177157 A1 | 7/2010 | Stephens et al. |
| 2010/0177158 A1 | 7/2010 | Walter |
| 2010/0177750 A1 | 7/2010 | Essinger et al. |
| 2010/0198983 A1 | 8/2010 | Monroe et al. |
| 2010/0226091 A1 | 9/2010 | Dunn |
| 2010/0231563 A1 | 9/2010 | Dunn et al. |
| 2010/0237697 A1 | 9/2010 | Dunn et al. |
| 2010/0238299 A1 | 9/2010 | Dunn et al. |
| 2010/0299556 A1 | 11/2010 | Taylor et al. |
| 2011/0019636 A1 | 1/2011 | Fukuoka et al. |
| 2011/0047567 A1 | 2/2011 | Zigmond et al. |
| 2011/0078536 A1 | 3/2011 | Han et al. |
| 2011/0283199 A1* | 11/2011 | Schuch .............. H04N 21/4424 715/740 |
| 2012/0105424 A1 | 5/2012 | Lee et al. |
| 2012/0203872 A1 | 8/2012 | Luby et al. |
| 2012/0302343 A1 | 11/2012 | Hurst et al. |
| 2012/0308191 A1 | 12/2012 | Chung et al. |
| 2013/0162908 A1 | 6/2013 | Son et al. |
| 2013/0173358 A1 | 7/2013 | Pinkus |
| 2013/0282154 A1 | 10/2013 | Chappell et al. |
| 2014/0002747 A1 | 1/2014 | Macholz |
| 2014/0009893 A1* | 1/2014 | Lai ...................... H05K 7/1487 361/728 |
| 2014/0172174 A1* | 6/2014 | Poss ...................... B65F 1/1426 700/275 |
| 2014/0230526 A1 | 8/2014 | Willemin et al. |
| 2015/0169827 A1 | 6/2015 | LaBorde |
| 2015/0193074 A1 | 7/2015 | Cudak et al. |
| 2015/0250021 A1 | 9/2015 | Stice et al. |
| 2016/0034240 A1 | 2/2016 | Kreiner et al. |
| 2016/0112521 A1* | 4/2016 | Lawson ................. H04L 67/02 709/227 |
| 2016/0292744 A1* | 10/2016 | Strimaitis .......... G06Q 30/0269 |
| 2017/0075777 A1* | 3/2017 | Dunn ................. G06F 11/2025 |
| 2017/0083043 A1 | 3/2017 | Bowers et al. |
| 2017/0163519 A1 | 6/2017 | Bowers et al. |
| 2017/0242502 A1 | 8/2017 | Gray et al. |
| 2017/0242534 A1 | 8/2017 | Gray |
| 2017/0256051 A1 | 9/2017 | Dwivedi et al. |
| 2017/0315886 A1 | 11/2017 | Helmick et al. |
| 2018/0027635 A1 | 1/2018 | Roquemore, III |
| 2018/0061297 A1 | 3/2018 | Schuch et al. |
| 2018/0181091 A1* | 6/2018 | Funk ..................... G08G 1/133 |
| 2018/0268783 A1 | 9/2018 | Woo |
| 2018/0284758 A1* | 10/2018 | Cella ..................... G06N 3/088 |
| 2018/0314103 A1 | 11/2018 | Dunn et al. |
| 2018/0364858 A1 | 12/2018 | Gray |
| 2018/0364859 A1 | 12/2018 | Gray |
| 2018/0364860 A1 | 12/2018 | Gray |
| 2018/0364861 A1 | 12/2018 | Gray |
| 2019/0087042 A1 | 3/2019 | Van Ostrand et al. |
| 2019/0171331 A1 | 6/2019 | Gray et al. |
| 2019/0258552 A1 | 8/2019 | Dunn et al. |
| 2020/0012383 A1 | 1/2020 | Wang et al. |
| 2020/0019363 A1 | 1/2020 | Newnham et al. |
| 2020/0272269 A1 | 8/2020 | Dunn |
| 2021/0117143 A1 | 4/2021 | Newnham et al. |
| 2021/0397292 A1 | 12/2021 | Dunn |
| 2022/0100452 A1 | 3/2022 | Newnham et al. |
| 2022/0317801 A1 | 10/2022 | Dunn |
| 2022/0413786 A1 | 12/2022 | Newnham et al. |
| 2023/0029615 A1 | 2/2023 | Dunn et al. |
| 2023/0048815 A1 | 2/2023 | Newnham et al. |
| 2023/0052966 A1 | 2/2023 | Newnham et al. |
| 2023/0160774 A1 | 5/2023 | Dunn et al. |

FOREIGN PATENT DOCUMENTS

| | | |
|---|---|---|
| EP | 0313331 B1 | 2/1994 |
| EP | 1821538 A1 | 8/2007 |
| EP | 2351369 A2 | 8/2011 |
| EP | 2396964 A2 | 12/2011 |
| EP | 3347793 A1 | 7/2018 |
| JP | 61-234690 A | 10/1986 |
| JP | 61-251901 A | 11/1986 |
| JP | 7-74224 A | 3/1995 |
| JP | 2000122575 A | 4/2000 |
| JP | 2002064842 A | 2/2002 |
| JP | 2002209230 A | 7/2002 |
| JP | 2005-211449 A | 8/2005 |
| JP | 2005-211451 A | 8/2005 |
| JP | 2005236469 A | 9/2005 |
| JP | 2005333568 A | 12/2005 |
| JP | 2010282109 A | 12/2010 |
| JP | 2018537876 A | 12/2018 |
| JP | 6639653 B2 | 1/2020 |
| KR | 10-2010-0081354 A | 7/2010 |
| KR | 10-2011-0065338 A | 6/2011 |
| KR | 10-2056069 B1 | 12/2019 |
| WO | WO9608892 A1 | 3/1996 |
| WO | WO2008050402 A1 | 5/2008 |
| WO | WO2011106683 A2 | 9/2011 |
| WO | WO2012/127971 A1 | 9/2012 |
| WO | WO2013/182733 A1 | 12/2013 |
| WO | WO2017044952 A1 | 3/2017 |
| WO | WO2020/176416 A1 | 9/2020 |
| WO | WO2023/009477 A1 | 2/2023 |

OTHER PUBLICATIONS

Texas Advanced Optoelectronic Solutions Inc., TCS230 Programmable Color Light-To-Frequency Converter, Dec. 2007, 12 pages.

Methven, Don, Wireless Video Streaming: An Overview, Nov. 16, 2022, 7 pages.

Outdoorlink, Inc., SmartLink One, One Relay, http://smartlinkcontrol.com/billboard/one-relay/, retrieved Apr. 17, 2019, 2007-16, 6 pages.

Outdoorlink, Inc., SmartLink Website User Manual, http://smartlink.outdoorlinkinc.com/docs/SmartLinkWebsiteUserManual.pdf, 2017, 33 pages.

Outdoorlink, Inc., SmartLink One Out of Home Media Controller, 2016, 1 page.

(56) References Cited

OTHER PUBLICATIONS

Sigmasense, Analog can't touch Digital, https://sigmasense.com/, retrieved Jan. 23, 2019, 5 pages.
Sigmasense, Solutions, https://sigmasense.com/solutions/, retrieved Jan. 23, 2019, 4 pages.
Sigmasense, Technology, https://sigmasense.com/technology/, retrieved Jan. 23, 2019, 3 pages.
Turley, Jim, SigmaSence ICCI Goes Big, New Touch Technology Aimed at Big Screens, But That's Just for Starters, EEJournal, https://www.eejournal.com/article/sigmasense-icci-goes-big/, Jan. 8, 2019, 3 pages.

\* cited by examiner

Proof of play report for Date range MM/DD/YYYY to MM/DD/YYYY

- Summary statistics
- Detailed information
  - Advertisement identifier (e.g., thumbnail, ID number)
  - Plays delivered
  - Display faces
  - Days played
  - Campaign duration
  - Site ID
  - Display part number

Figure 20

SYSTEMS AND METHODS FOR REMOTELY MONITORING ELECTRONIC DISPLAYS

CROSS-REFERENCE TO RELATED APPLICATION

This application is a continuation of U.S. application Ser. No. 17/974,361 filed Oct. 26, 2022, which is a continuation-in-part of U.S. application Ser. No. 17/893,253 filed Aug. 23, 2022, which is a continuation of U.S. application Ser. No. 17/548,698 filed Dec. 13, 2021, which is a continuation of U.S. application Ser. No. 17/134,634 filed Dec. 28, 2020, which is a continuation of U.S. application Ser. No. 16/508,877 filed Jul. 11, 2019, which claims the benefit of U.S. Provisional Application No. 62/697,016 filed Jul. 12, 2018, the disclosure of each of which are hereby incorporated by reference as if fully restated herein.

TECHNICAL FIELD

Exemplary embodiments relate generally to systems and methods for remotely monitoring electronic display assemblies.

BACKGROUND AND SUMMARY OF THE INVENTION

The use of electronic displays has increased in recent years. Beyond personal use, these electronic displays are sometimes placed in an enclosure, which may be ruggedized, for both indoor and/or outdoor use. For example, without limitation, such display assemblies may be placed outdoors, such as on sidewalks or on the tops of vehicles to name some examples, to display advertisements or other information. Oftentimes these display assemblies are associated with other electronic equipment to provide features such as, but not limited to, video conferencing, web browsing, way finding, image capture, emergency notification, and the like. It is desirable to provide owners, manufactures, operators, renters, or the like of such display assemblies with access to operations data regarding the status and operation of such display assemblies. Furthermore, these display assemblies consume a significant amount of power during operation. A significant amount of the energy consumption of such display assemblies comes from operation of the backlight. Particularly as the use of such display assemblies has increased, it is desirable that such operations data include data regarding the energy consumption of the display, including but not limited to, status and operation of the backlight. Such operations data may be stored and presented to display owners and other relevant parties such that energy consumption and reliability may be tracked. Certain operations parameters may be adjusted in response to the presented data. For example, without limitation, backlight levels may be adjusted downward to reduce energy consumption or maintenance frequencies may be increased in response to reported display assembly downtime.

However, for many such display assemblies, multiple parties may have an interest in the operations data. For example, a display assembly manufacturer may have an interest in monitoring its tens, hundreds, thousands, tens of thousands, etc. of display assemblies. Each owner or renter of one or more such display assemblies might likewise have an interest in monitoring the display assemblies it owns. While the manufacturer may already have access to this operations data, the operations data may include data for all owners or renters. Thus, the operations data may be co-located with operations data for other owners or renters. Allowing complete access to such data may create privacy concerns. However, individual storage of each client's information would potentially require multiple storage devices, increasing complexity and expense. Therefore, what is needed is a system and method for providing access to co-located operations data for a display assembly.

The present disclosures provide a system and method for providing access to co-located operations data for a display assembly. The system may comprise one or more client devices in communication with a centralized monitoring center via a network. Multiple display assemblies may likewise be in communication with the monitoring center via the network. In exemplary embodiments, each display assembly comprises one or more electronic displays and other electronic components for operation of the display assembly in electrical connection with a display controller. The display controller may likewise be in electrical connection with a network interface device. The network interface device may likewise be in communication with the centralized monitoring center via the network.

Operations data may be continually gathered and transmitted to the central monitoring center for storage. The received operations data may be processed. Such processing may determine which client(s) are associated with the operations data and what the operations data represents. The operations data may be summarized and presented in a visual depiction. Upon receipt of a client request for operations information, client specific information may be retrieved and presented to the client in the visual depiction. In other exemplary embodiments, upon login, a client may be permitted to remotely operate or modify display assemblies associated with the client.

Remote monitoring and/or operation of display assemblies may permit display owners, operators, users, combinations thereof, or the like to monitor display assembly status and/or exert operational control over the same from various locations. A wide variety of data points, which may include information, configuration settings, operational parameters, combinations thereof, or the like related to status and/or operation of the display assemblies may be monitored and/or updated.

Monitored data points may include, for example without limitation, one or more of: internal temperatures, external temperatures, ambient weather conditions, ambient lighting, backlight levels, ambient pressures, internal pressures, geographic locations, power consumption information, power input information, power output information, status information, identifying information, proof of play information, humidity information, configuration information, usage information, fan speed information, combinations thereof, or the like. Such settings may include, for example without limitation, one or more of: fan speed, backlight levels, day-to-night or night-to-day transition information, temperature tolerances, dewpoint spread tolerances, combinations thereof, or the like. Any number, type, and/or kind of settings and/or data points may be tracked, reported, and/or updated. Any number, type, and/or kind of sensors may be provided for determining the various data points, such as but not limited to temperature sensors, pressure sensors, ambient light sensors, airspeed sensors, power level sensors, combinations thereof, or the like. The data points and/or settings may be filtered for more focused presentation, such as but not limited to, based on customer identifier, geographic region, part number, serial number, type of metric or setting, applicable dates, applicable ranges, combinations thereof, or the like. The data points may be presented in summary form, such as for a single display assembly and/or multiple display assemblies, over time (e.g., in time dependent graphical form), table form, spreadsheet, in dashboard form, or in detailed form for a single or multiple display assemblies. The data may be presented for a single display or multiple displays. Displayed data may be limited to that associated with a particular customer identifier, in exemplary embodiments, without limitation.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 20 is another exemplary user display generated by at least the system of FIG. 1.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
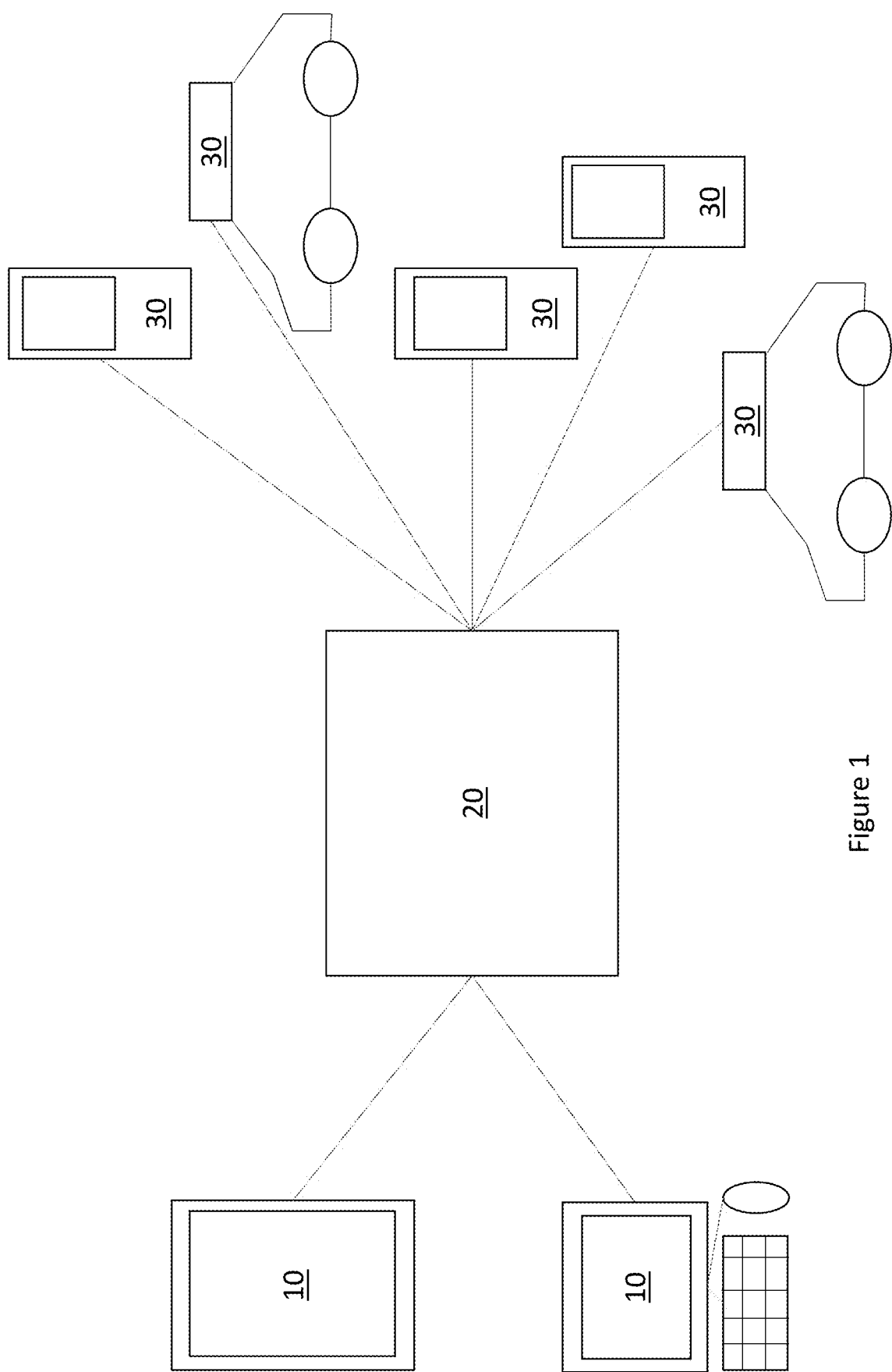
FIG. 1 is a simplified plan view of an exemplary system.

FIG. 1 is a simplified block diagram of an exemplary system. A number of display assemblies 30 may be in communication with a monitoring center 20. Similarly, a number of client devices 10 may be in communication with the monitoring center 20. The display assemblies 30 may be located remote from the monitoring center 20. Likewise, the client devices 10 may be located remote from the monitoring center 20. The communication between the display assemblies 30, the monitoring center 20, and the client devices 10 may be made by way of a network 80. The network 80 may be any network such as a cellular network, internet, intranet, world wide web, or the like. The network 80 between the client devices 10 and the monitoring center 20 may be the same or may be different from the network 80 between the monitoring center 20 and the display assemblies 30.

Each of the display assemblies 30 may be any kind of display assembly 30, such as but not limited to, a freestanding display kiosk configured for placement on a sidewalk, a wall-mounted display unit, a vehicle topper unit, or the like. Each of the client devices 10 may be a personal electronic device such as, but not limited to, a smartphone, tablet, smartwatch, laptop, desktop computer, some combination thereof, or the like.

Figure 2:
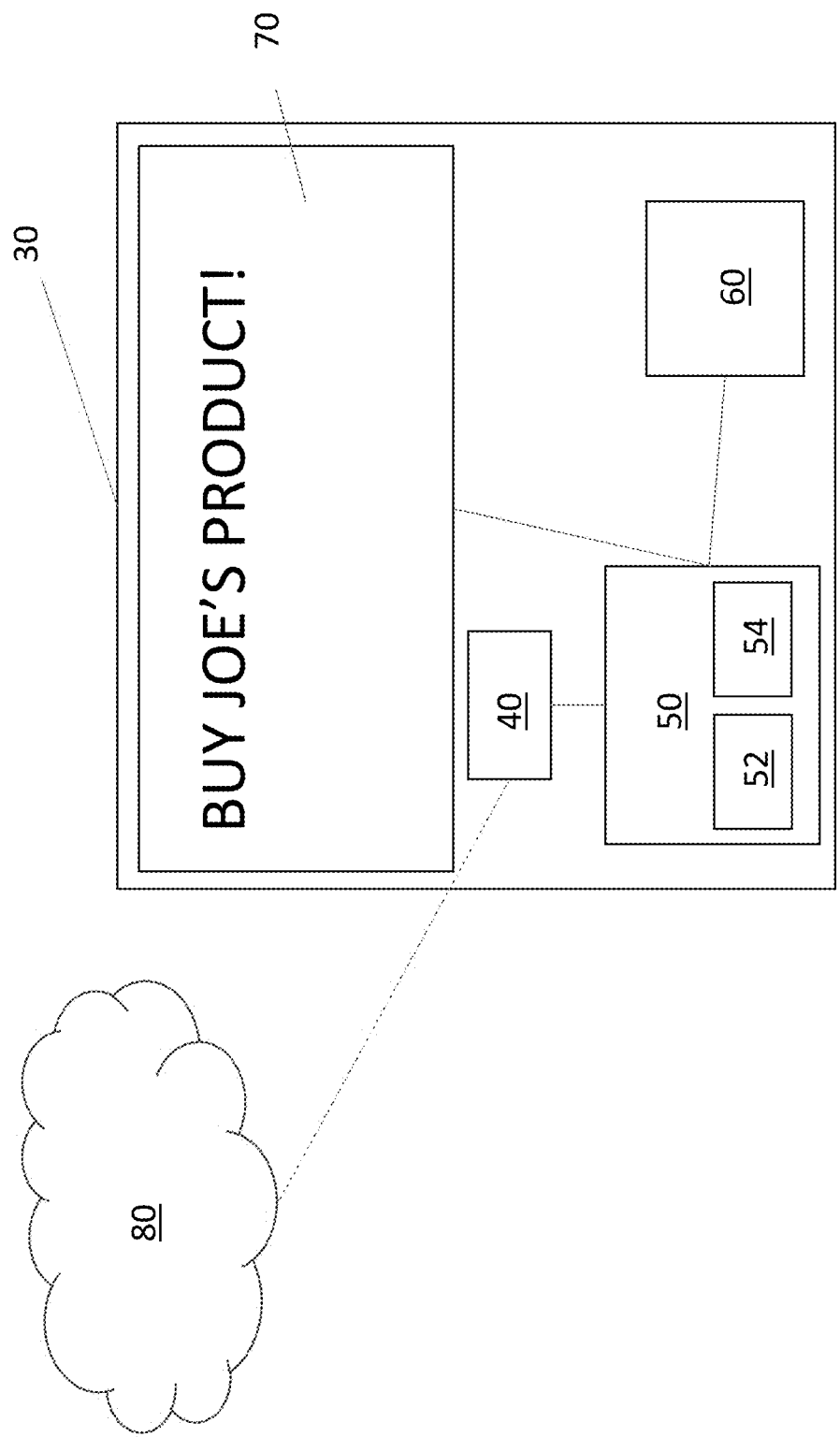
FIG. 2 is a detailed view of an exemplary display assembly of FIG. 1.

FIG. 2 is a detailed view of an exemplary display assembly 30 of FIG. 1. Each display assembly 30 may comprise one or more electronic displays 70 in electrical connection with a display controller 50. Each electronic display 70 may comprise a backlight for illuminating the electronic display 70. The electronic display 70 may comprise one or more a liquid crystal displays, light emitting diode ("LED") displays, organic LED displays, plasma displays, some combination thereof, or the like. One or more of the electronic displays 70 may comprise touch capabilities. The backlight may be comprised of a number of LEDs arranged in a directly backlit, edge-lit, or other orientation.

In exemplary embodiments, the display controller 50 may be in electrical connection with other components 60 for operating the display assembly 30. Such components 60 may include, but are not limited to, fans, temperature sensors, light sensors, fan speed sensors, power consumption sensors, air quality sensors, weather sensors, other sensors, telephone equipment, video conferencing equipment, voice over internet protocol (VOIP) equipment, touch screens, camera, microphones, emergency notification devices, processors, electronic storage devices, wayfinding equipment, location detection devices, video players, proof of play devices, and the like. Any number, combination, and/or type of components are contemplated.

The display controller 50 may be configured to gather operations data from the electronic display 70. The display controller 50 may, alternatively or additionally, be configured to gather operations data from the components 60. Such operations data may include, but is not limited to, proof of play data, fan speed data, temperature data, humidity data, power consumption data, ambient light data, weather data, backlight data, electronic display data, status data, emergency notification data, air quality data, sensor readings, camera images or video recordings, microphone audio recordings, use history, and the like. The operations data for multiple clients may be co-located at the electronic storage device 52 located at the display assembly 30. Portions of the operations data may be associated with one or more client identifiers. For example, without limitation, operations data associated with a particular image displayed on the electronic display 70 may be associated with a particular client identifier. Alternatively, or in addition, all operations data originating from one or more display assemblies 30 may be associated with one or more client identifiers. This may permit for specific clients to access and retrieve only the operations data associated with the particular client—permitting the co-location of such operations data while maintaining privacy. The association with a client identifier may be performed at the display assembly 30 or at the monitoring center 20. The client identifiers may be, without limitation, unique alphanumeric serial numbers.

The display controller 50 may be in electrical communication with a network connection device 40. The network connection device 40 may be configured to transmit information to the monitoring center 20, including but not limited to, the operations data. In exemplary embodiments, the network connection device 40 may likewise be configured to receive information from the monitoring center 20, including but not limited to, operation instructions. Such operations instructions may comprise remote login capabilities, remote viewing, fan speed instructions, backlight adjustment instructions, video or image files for display on the electronic displays 70, some combination thereof, or other instructions for operation of the display assembly 30. The network connection device 40 may transmit and/or receive such information by way of the network 80.

The display controller 50 may comprise an electronic storage device 52 for storing the operations data and/or operations instructions. The display controller 50 may also comprise a processor 54 for processing the operations data and/or operations instructions. The electronic storage device 52 may comprise software instructions, which when executed, configure the processor 54 to perform various steps and processes described herein.

Figure 3:
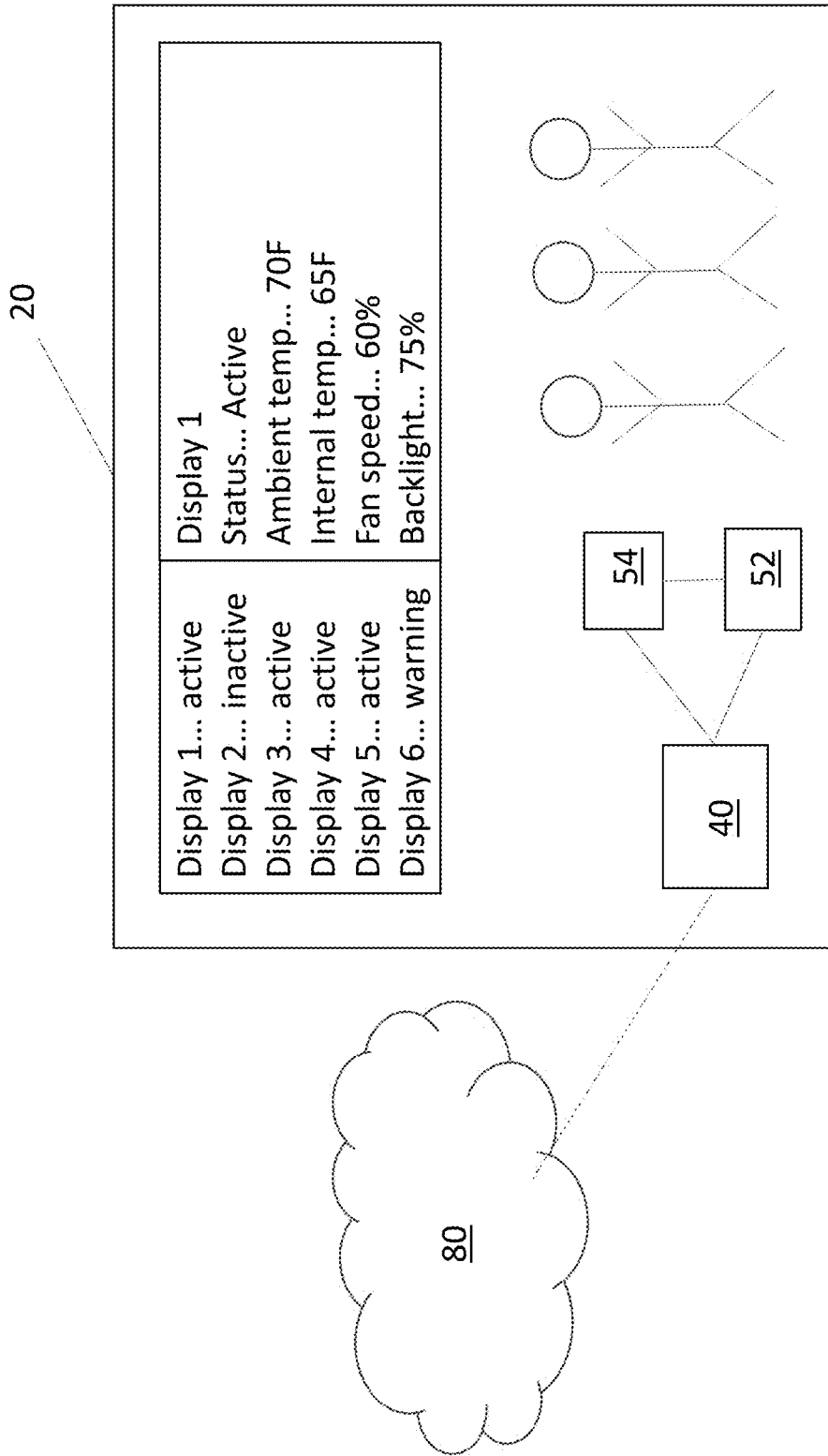
FIG. 3 is a detailed view of an exemplary monitoring center of FIG. 1.

FIG. 3 is a detailed view of an exemplary monitoring center 20 of FIG. 1. The monitoring center 20 may comprise an electronic storage device 52 for storing the operations data and/or operations instructions. The monitoring center 20 may also comprise a processor 54 for processing the operations data and/or operations instructions. The electronic storage device 52 may comprise software instructions, which when executed, configure the processor 54 to perform various steps and processes described herein. The processor 54 may be the same or different from the processor 54 of the display assembly 30.

The monitoring center 20 may further comprise a network connection device 40. The network connection device 40 may be in electrical communication with the processor 54 and the electronic storage device 52. The network connection device 40 may be in electrical communication with one or more of the display assemblies 30. The network connection device 40 may be configured to receive operations data from the one or more display assemblies 30. The network connection device 40 may also be configured to transmit operations instructions to one or more of the display assemblies 30.

The network connection device 40 may be receive the operations data and pass it to the electronic storage device 52 for storage. The operations data for multiple display assemblies 30 may be co-located at the electronic storage device 52 located at the monitoring center 20. Co-location may be accomplished by associating portions of the operations data with one or more client identifiers. Each portion of the operations data associated with a particular client identifier may be stored on a common electronic storage device 52, but electronically partitioned to ensure that the operations data associated with each particular client is maintained separate.

Alternatively, or in addition, all operations data originating from one or more display assemblies 30 may be associated with one or more client identifiers. This may permit for specific clients to access and retrieve only the operations data associated with the particular client—permitting the co-location of such operations data while maintaining privacy. The network connection device 40 may transmit and/or receive such operations data and/or operations instructions by way of the network 80.

The gathering, transmitting, storing, receiving, and retrieving of operations data and/or operations instructions as shown and described herein may be accomplished, wholly or in part, by the use of a microservices architecture. Any of the other steps or methods described herein may likewise be accomplished, wholly or in part, by the use of a microservices architecture.

The monitoring center 20 may be a brick-and-mortar location staffed with a number of monitoring personnel, though such is not required. In exemplary embodiments, the monitoring center 20 may comprise one or more rooms with one or more displays which may provide status and/or operations information for one or more display assemblies 30. For example, without limitation, a complete or partial list of display assemblies 30 and status information for each display assembly 30 may be shown. Information for a subset of display assemblies 30 may be shown in a rotating, scrolling, or other fashion. Detailed information regarding one or more display assemblies 30 may be shown on the same or a separate screen. A number of personal electronic devices, such as but not limited to, smartphone, tablet, smartwatch, laptop, desktop computer, some combination thereof, or the like may likewise display some or all of the information and may be configured to receive user input comprising operational instructions for one or more of the display assemblies 30.

Figure 4:
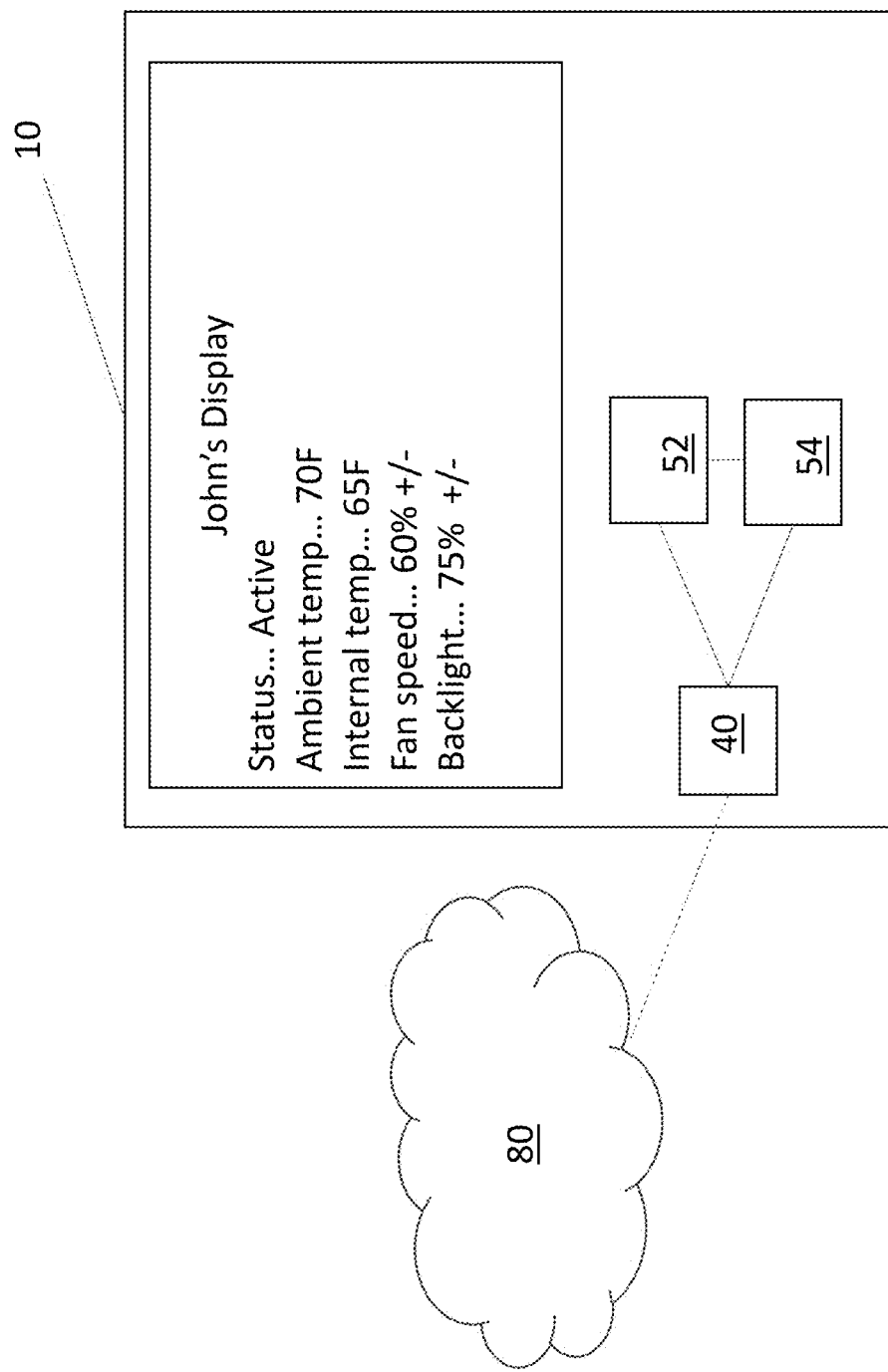
FIG. 4 is a detailed view of an exemplary client device of FIG. 1.

FIG. 4 is a detailed view of an exemplary client device 10 of FIG. 1. The client device 10 may be any personal electronic device, including but not limited to, a smartphone, tablet, smart watch, laptop, desktop computer, some combination thereof, or the like. The client device 10 may comprise an electronic storage device 52 for storing the operations data and/or operations instructions. The client device 10 may also comprise a processor 54 for processing the operations data and/or operations instructions. The electronic storage device 52 may comprise software instructions, which when executed, configure the processor 54 to perform various steps and processes described herein. The processor 54 may be the same or different from the processor 54 of the client device 10.

The client device 10 may further comprise a network connection device 40. The network connection device 40 may be in electrical communication with the processor 54 and the electronic storage device 52. The network connection device 40 may be in electrical communication with the monitoring center 20. The network connection device 40 may be configured to receive operations data from the one or more display assemblies 30 by way of the monitoring center 20. In exemplary embodiments, the network connection device 40 may be receive such operations data and store it on the electronic storage device 52. The network connection device 40 may be configured to transmit operations instructions to the monitoring center 20. The network connection device 40 may transmit and/or receive such information by way of the network 80. In exemplary embodiments, the receipt of operations data and/or transmission of operations instructions is accomplished by use of an internet browsing application and an internet-based user interface 90.

Figure 5:
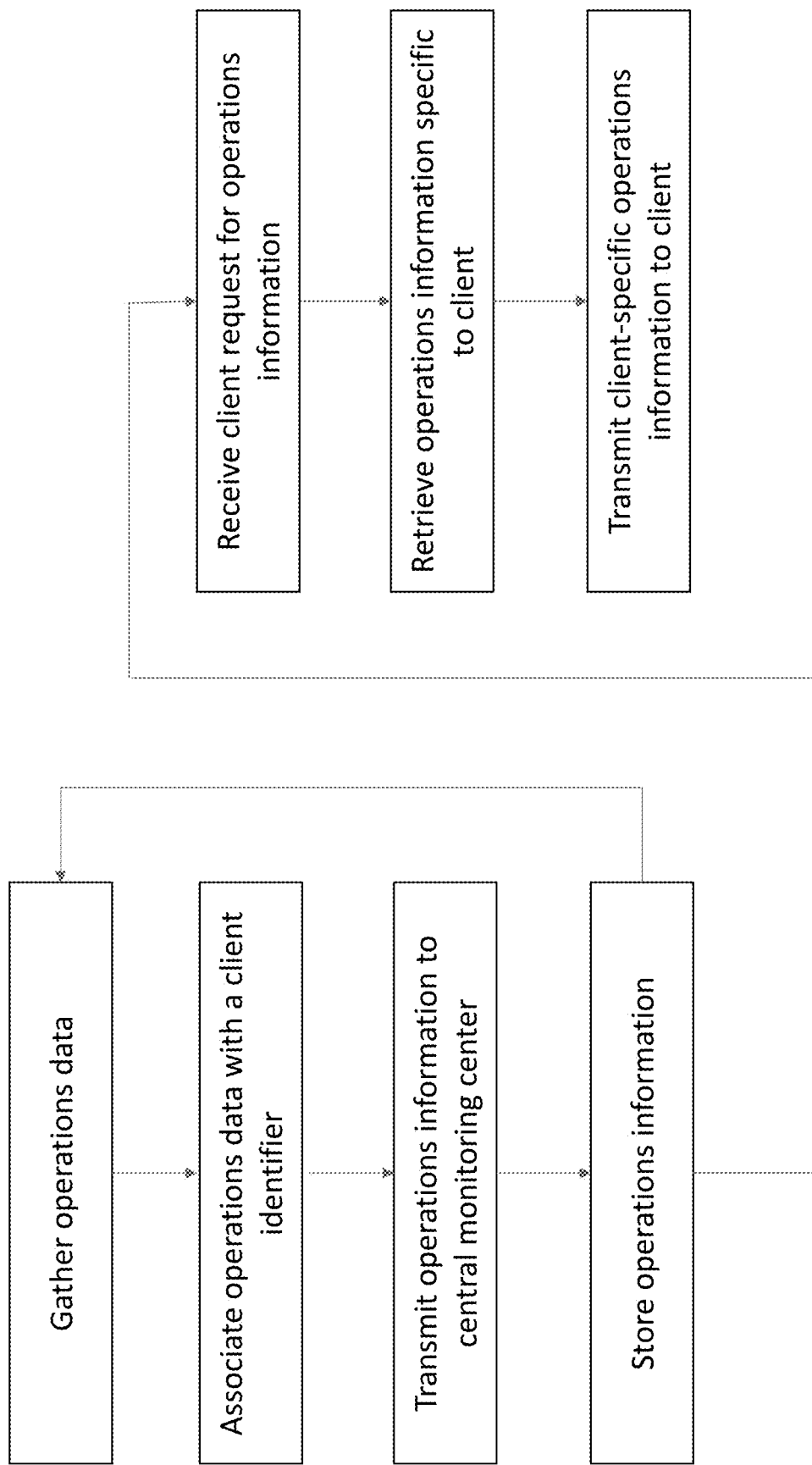
FIG. 5 is a flow chart of exemplary logic for use with the system of FIG. 1.

FIG. 5 is a flow chart of exemplary logic for use with the system of FIG. 1. The display controller 50 may gather operations data the one or more electronic displays 70 and/or the other components 60 of the respective display assembly 30. The operations data may be associated with one or more client identifiers. This operations data may be stored on the electronic storage device 52 of the respective display assembly 30. The operations data may be transmitted by way of the network connection device 40 and the network 80 to the monitoring center 20 where it may be stored on one or more electronic storage devices 52 at the monitoring center 20. In exemplary embodiments, the processor 54 at the monitoring center 20 may associate the operations data with one or more client identifiers. The processor 54 may electronically partition the electronic storage device 52 such that operations data associated with each particular client identifier is kept separate from operations data associated with other client identifiers. This process may be repeated continuously or at any interval. Alternatively, or in addition, a client identifier may be associated with the operations data when transmitted to the monitoring center 20.

A client request for operations data may be received from one or more of the client devices 10 at the monitoring center 20. The monitoring center 20 may retrieve the operations data associated with the client. In exemplary embodiments, this may involve retrieving all operations data associated with one or more of the display assemblies 30 associated with the client. Alternatively, or in addition, operations data specific to the client from a particular display assembly 30 may be retrieved. Stated another way, any single display assembly 30 may comprise operations data for multiple clients and only the operations data specific to the particular client may be retrieved. The retrieved operations data specific to the client may then be transmitted to the appropriate client device(s) 10. In exemplary embodiments, data specific to the client may be identified by way of the client identifiers. Operations data may be requested from each electronic display assembly 30 periodically, continuously, sequentially, in a particular order, some combination thereof, or the like.

Figure 6:
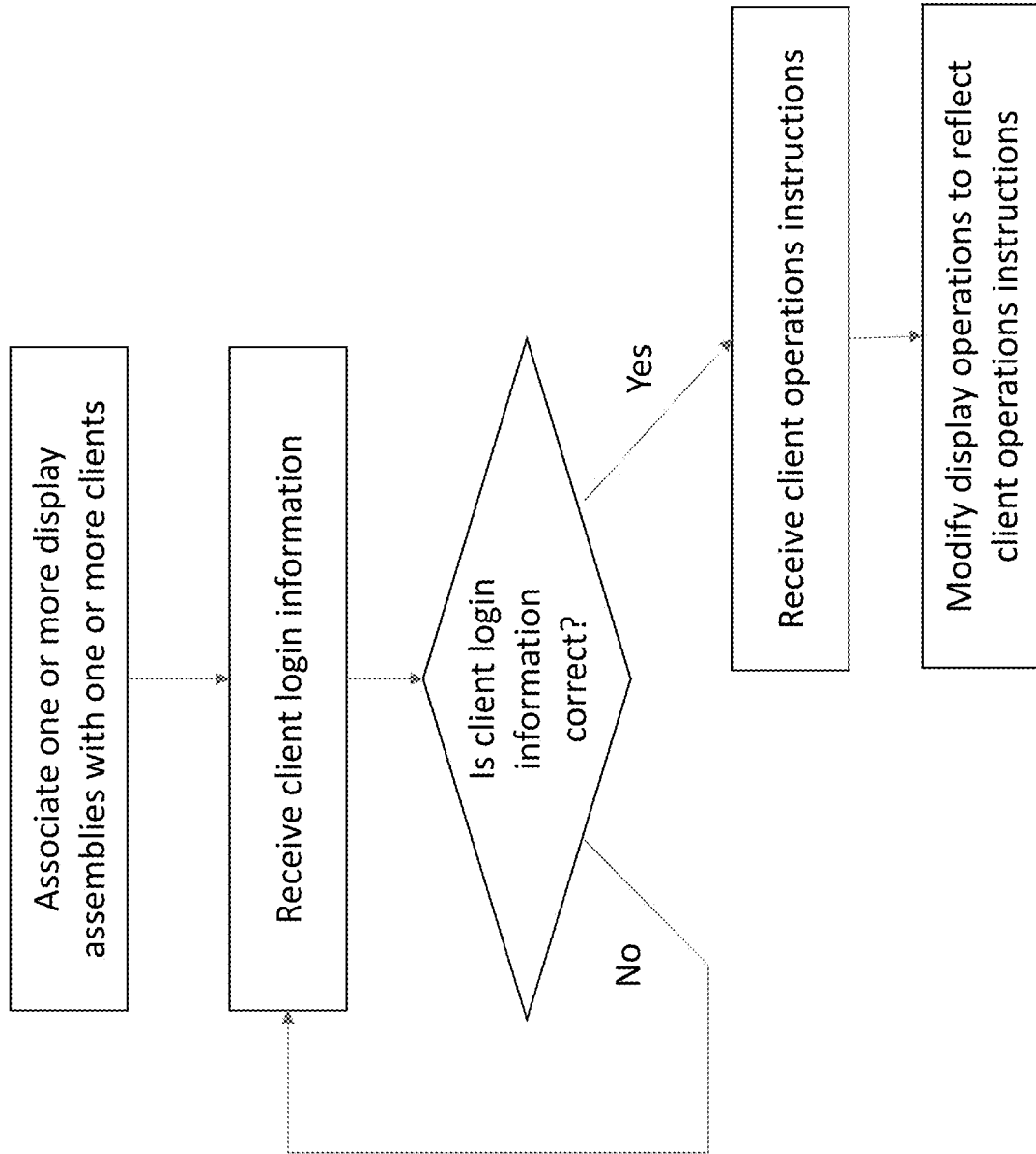
FIG. 6 is a flow chart of other exemplary logic for use with the system of FIG. 1.

FIG. 6 is a flow chart of other exemplary logic for use with the system of FIG. 1. One or more display assemblies 30 may be associated with one or more clients. A client login request may be received by way of one or more client devices 10 at the monitoring center 20. If the client login is not successful (e.g., if the user name and/or password are incorrect) the request may be denied. If the client login is successful (e.g., the user name and password are correct) the client may be permitted to remotely access one or more display assemblies 30 associated with the client. In exemplary embodiments, client login may be made by way of user name and password, one time use codes, biometric information, some combination thereof, or the like. Any method or system for verifying client identity is contemplated. Such access may be made by way of the monitoring center 20. The client may be able to view and retrieve operations data for the one or more display assemblies 30 associated with the client. The client may also be permitted to submit operation instructions for the one or more display assemblies 30 associated with the client. The operations of the one or more display assemblies 30 associated with the client may then be modified to reflect the received client operation instructions. Permissions may be tailored on a per client basis such that only certain display assemblies 30 may be accessed and/or modified when particular client login information is provided.

Figure 7:
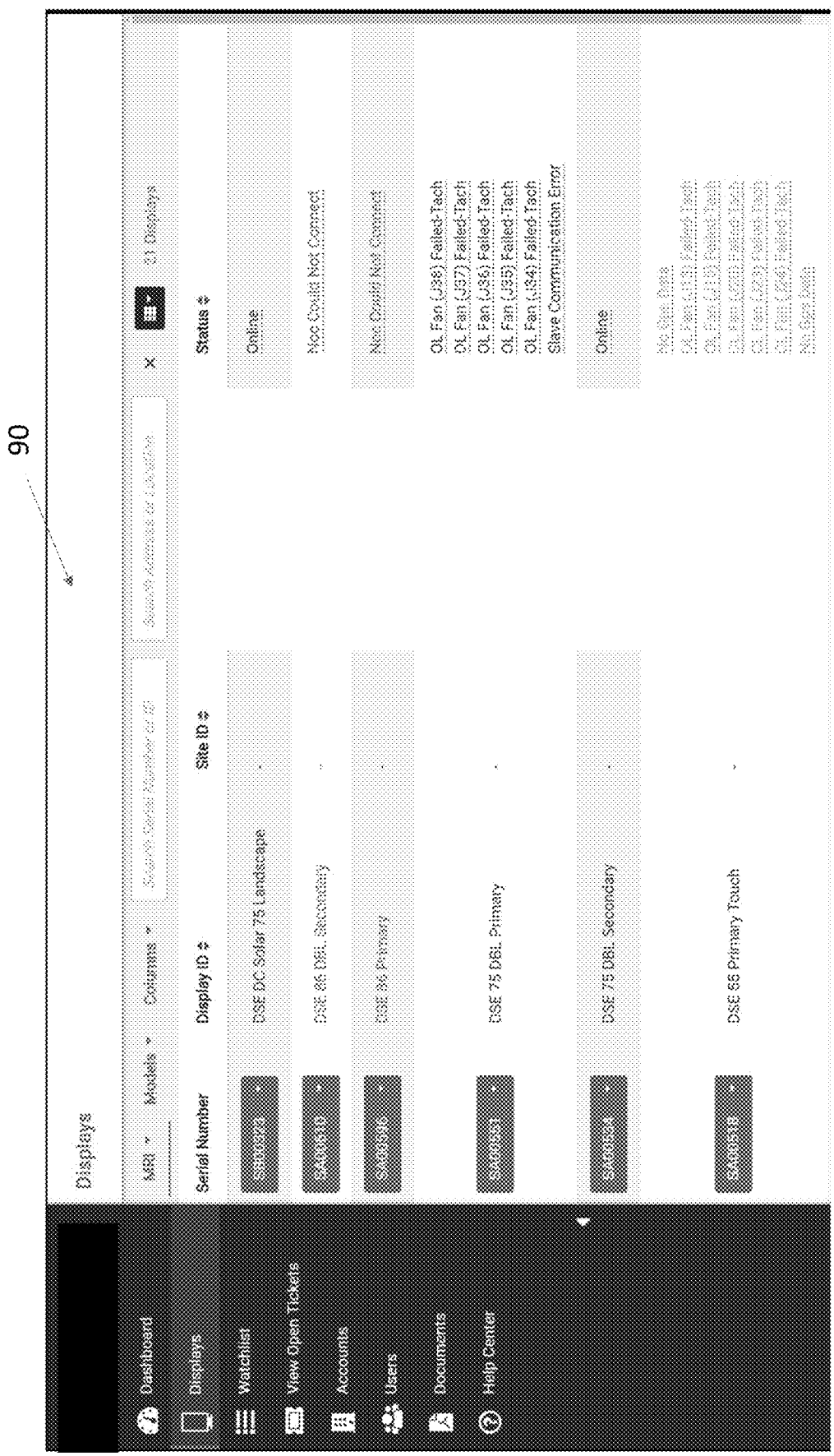
FIG. 7 is an exemplary user interface for use with the system of FIG. 1.

FIG. 7 is an exemplary user interface 90 for use with the system of FIG. 1. The user interface 90 may display overview information regarding a number of display assemblies 30, each of which may be associated with a particular client though such is not required. Information about each display assembly 30 may include, but is not limited to, the serial number, description information, site information, and status information of each display assembly 30. Status information, current and/or historical, may also be provided.

Figure 8:
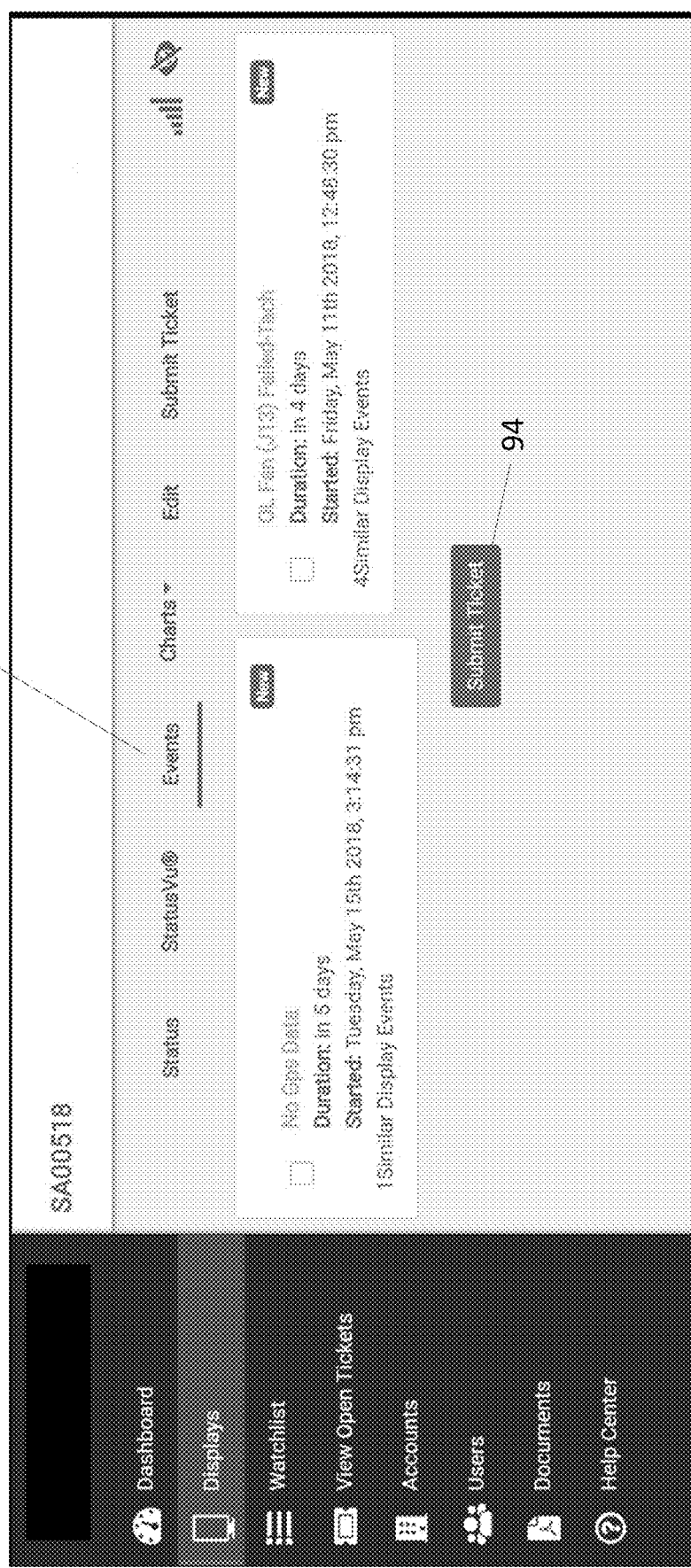
FIG. 8 is another exemplary user interface for use with the system of FIG. 1.

As shown in FIG. 8, event information for each of the display assemblies 30 associated with a particular client may be depicted under an events tab 92. The event information may include, but is not limited to, errors and warnings associated with one or more particular display assemblies 30. An option to automatically generate a repair request ticket 94 may be provided for each event.

Figure 9:
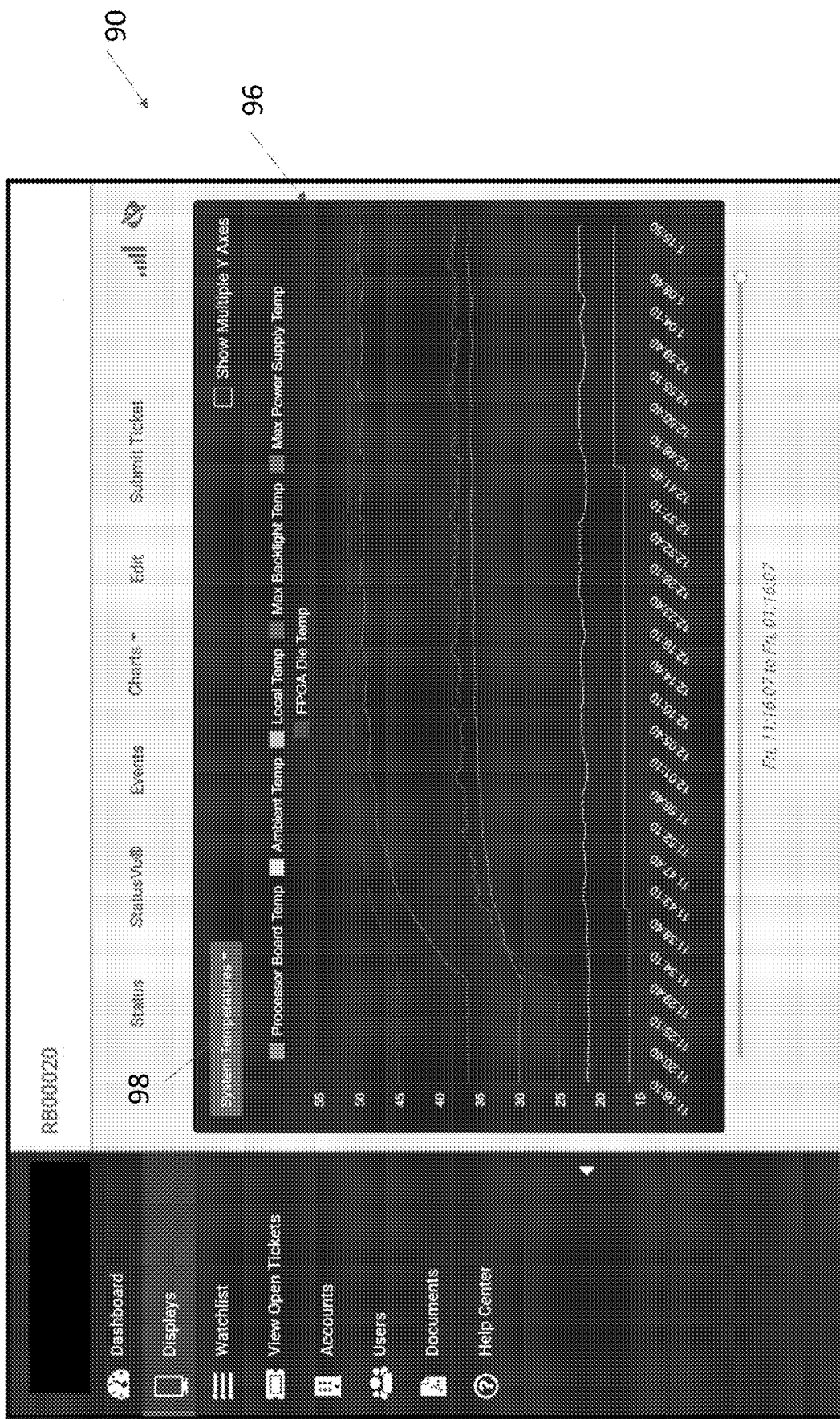
FIG. 9 is another exemplary user interface for use with the system of FIG. 1.

FIG. 9 is another exemplary user interface 90 for use with the system of FIG. 1. A visualization 96 of current and historical operations data may be displayed. Such operations data may comprise data from one or more sensors associated with a display assembly 30. In exemplary embodiments, the visualization 96 may be displayed in tabular form or a graphical representation such as, but not limited to, a line chart, bar chart, scatter diagram, or the like. Various categories of data may be depicted in the visualization 96 as selected by use of a menu 98. Such categories may be displayed in a color-coded fashion.

Figure 10:
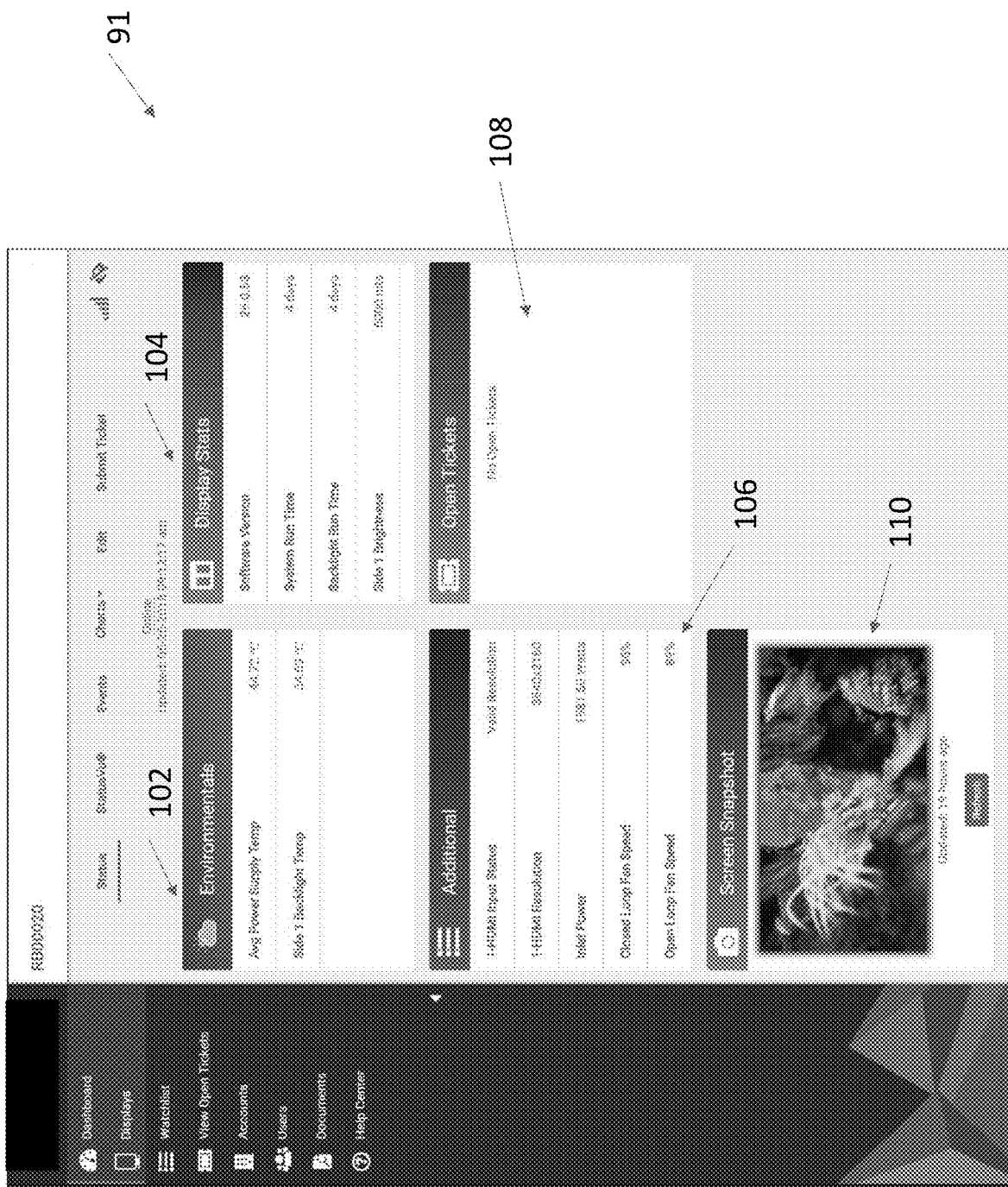
FIG. 10 is another exemplary user interface for use with the system of FIG. 1.

FIG. 10 is an exemplary summary dashboard 91, which may be configured to display summary information regarding a particular display assembly 30. Environmental information 102 may be displayed such as, but not limited to, the average power supply temperature and average backlight temperature. Display status information 104 may also be displayed such as, but not limited to, the software version, the system run time, the backlight run time, and the brightness of each display. Additional information 106 may also be displayed such as, but not limited to, the status and resolution of various inputs, the inlet power supply, and the fan speed of various fans in the display assembly 30. Any open repair request tickets may be displayed at an open ticket information area 108. A screen capture 110 of what is currently being displayed, was previously displayed, and/or is scheduled to be displayed next on the display assembly 30 may also be provided.

Figure 11:
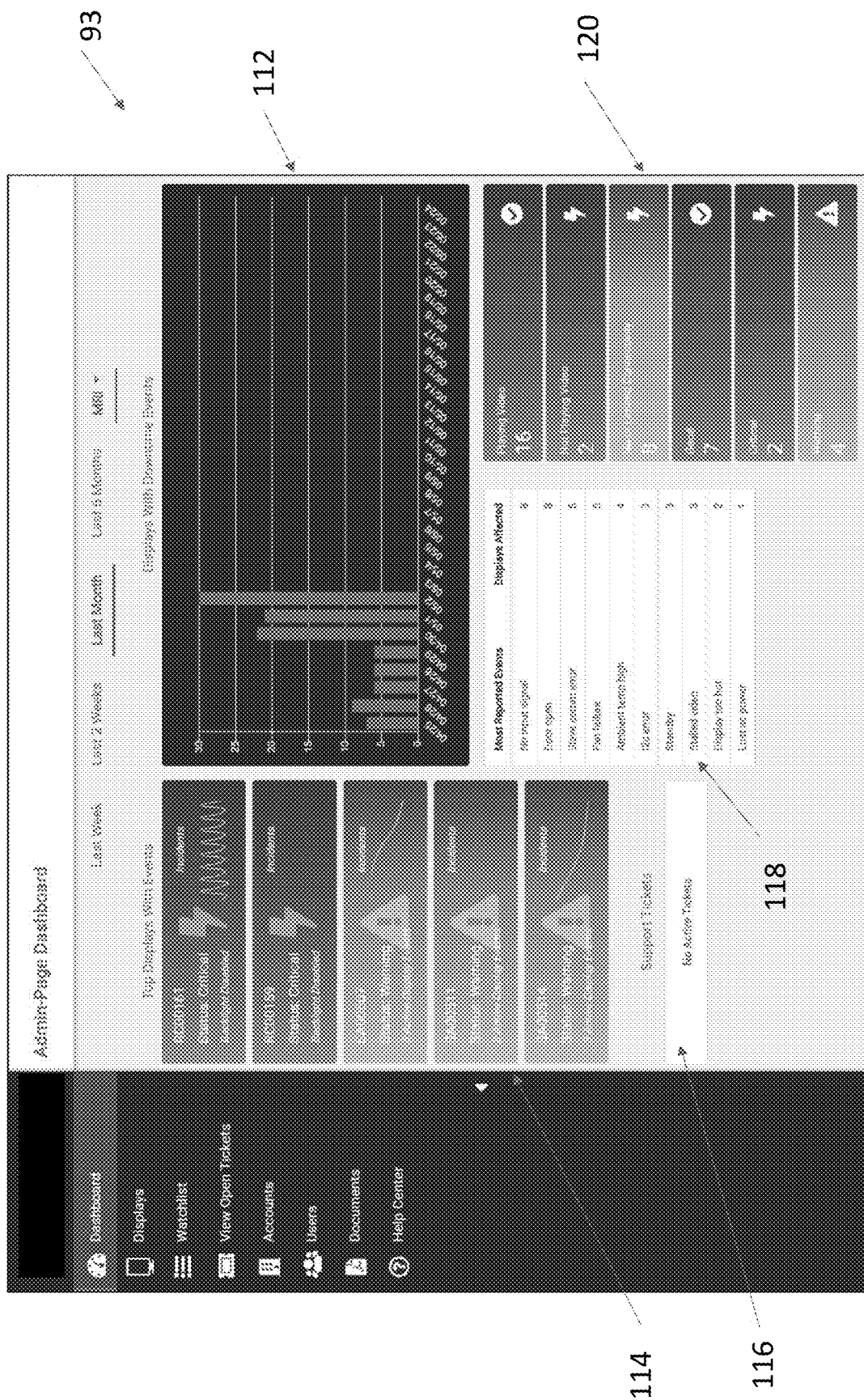
FIG. 11 is another exemplary user interface for use with the system of FIG. 1.

FIG. 11 is another exemplary summary dashboard 93, which may be configured to display summary information regarding all display assemblies 30 associated with a particular client identifier. The number of display assemblies 30 with some downtime event may be depicted in a downtime visualization 112. In exemplary embodiments, the downtime visualization 112 is a bar graph tracked by date, though any form of visualization is contemplated. A listing of top display assemblies with events 114 may be provided. A summary of repair ticket requests 116 may also be provided depicting all open repair ticket requests. A summary of the most reported events 118 may list the event(s) in question and the number of display assemblies 30 affected by the given event(s). The summary of the most reported events 118 may be presented in tabular form, though such is not required. Finally, a status summary 120 of all display assemblies 30 associated with a given client identifier may be provided. The status summary 120 may include, but is not limited to, the number of display assemblies 30 associated with the given client identifier which are playing video, not playing video, having no or limited network connectivity, in good condition, in critical condition, or having one or more warning events.

FIG. 12 through FIG. 21 illustrate exemplary user displays 90 that may be generated by the display assemblies 30, systems, and/or methods shown and/or described herein. Some or all of the display assemblies 30 may comprise the components 60 and/or the controllers 50, which may individually or collectively be configured to monitor, report, and/or adjust all of the data points shown and/or described. Such data points may be provided in raw, processed, and/or summarized form. The user displays 90 may comprise visualized data and/or provide options for a user to select, manipulate, filter, present, combinations thereof, or the like, the data points. The user displays 90 may present data, such as in a read-only format, and/or may provide options for the user to input new operational settings, parameters, filter criteria, combinations thereof, or the like.

The user displays 90 may comprise data specific to display assemblies 30 associated with a received customer identifier and/or other criteria, such as but not limited to geographic region, part number, serial number, combinations thereof, or the like. The user displays 90 may be generated in accordance with one or more user preferences or settings associated with various customer identifiers, by way of non-limiting example. The user displays 90 may be provided in various formats (e.g., read-only, read-write) based on permissions associated with various customer identifiers, by way of non-limiting example.

A number of exemplary user displays 90 are shown and/or described herein without limitation, such as without limitation as to the type, kind, and/or arrangement of data. Any amount, type, kind, and/or arrangement of data may be provided at any type, kind, and/or number of user displays 90. The data may be presented in such user displays 90 in any type or kind of format, such as but not limited to table, spreadsheet, graphical (e.g., line chart, bar chart, plot, pie chart, combinations thereof, or the like), text, combinations thereof, or the like. Maximum, minimum, mean, median, mode, or the like values may be generated and/or provided. The data may be presented and updated in substantially real time or represent historical data and presented for particular time periods, by way of non-limiting example.

Figure 12:
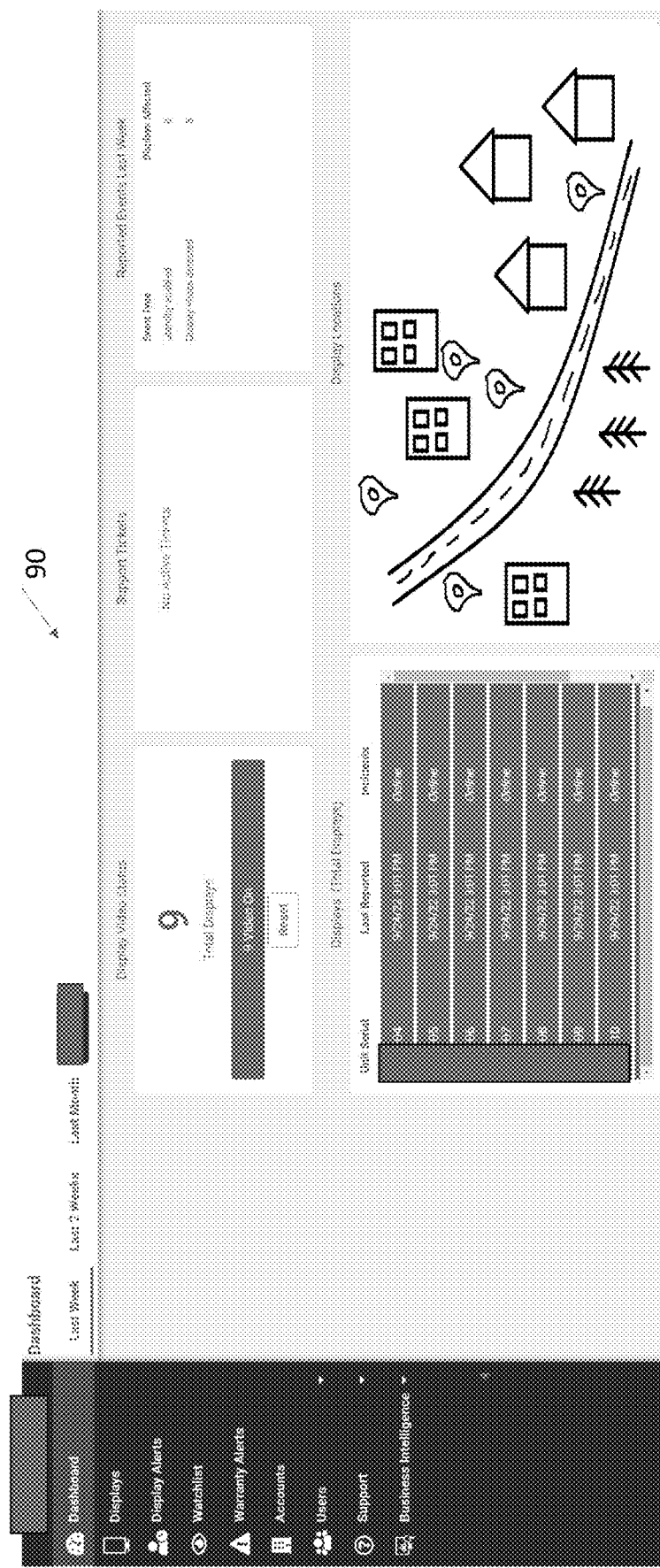
FIG. 12 is another exemplary user display generated by at least the system of FIG. 1.
Figure 13:
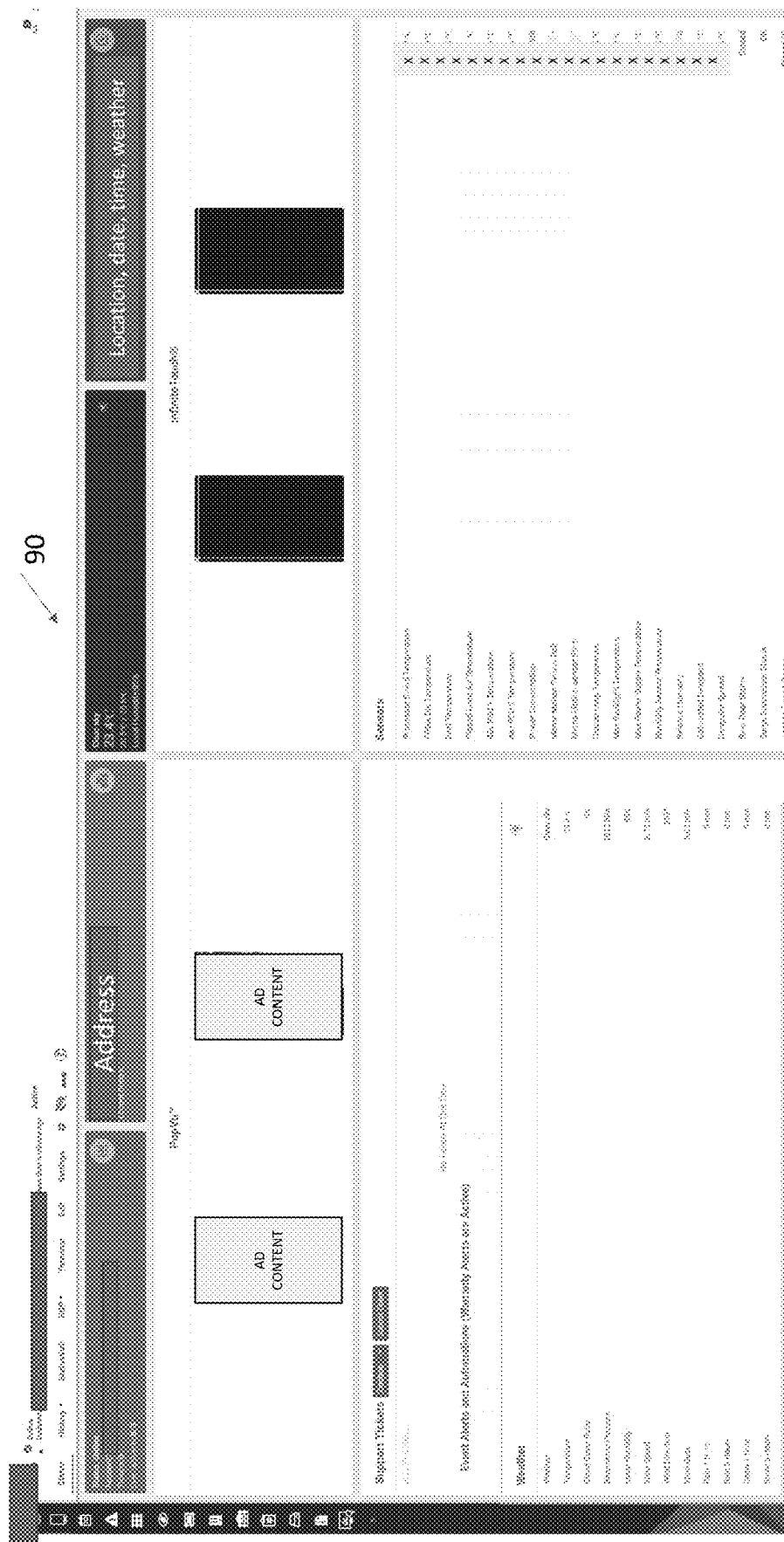
FIG. 13 is another exemplary user display generated by at least the system of FIG. 1.
Figure 14:
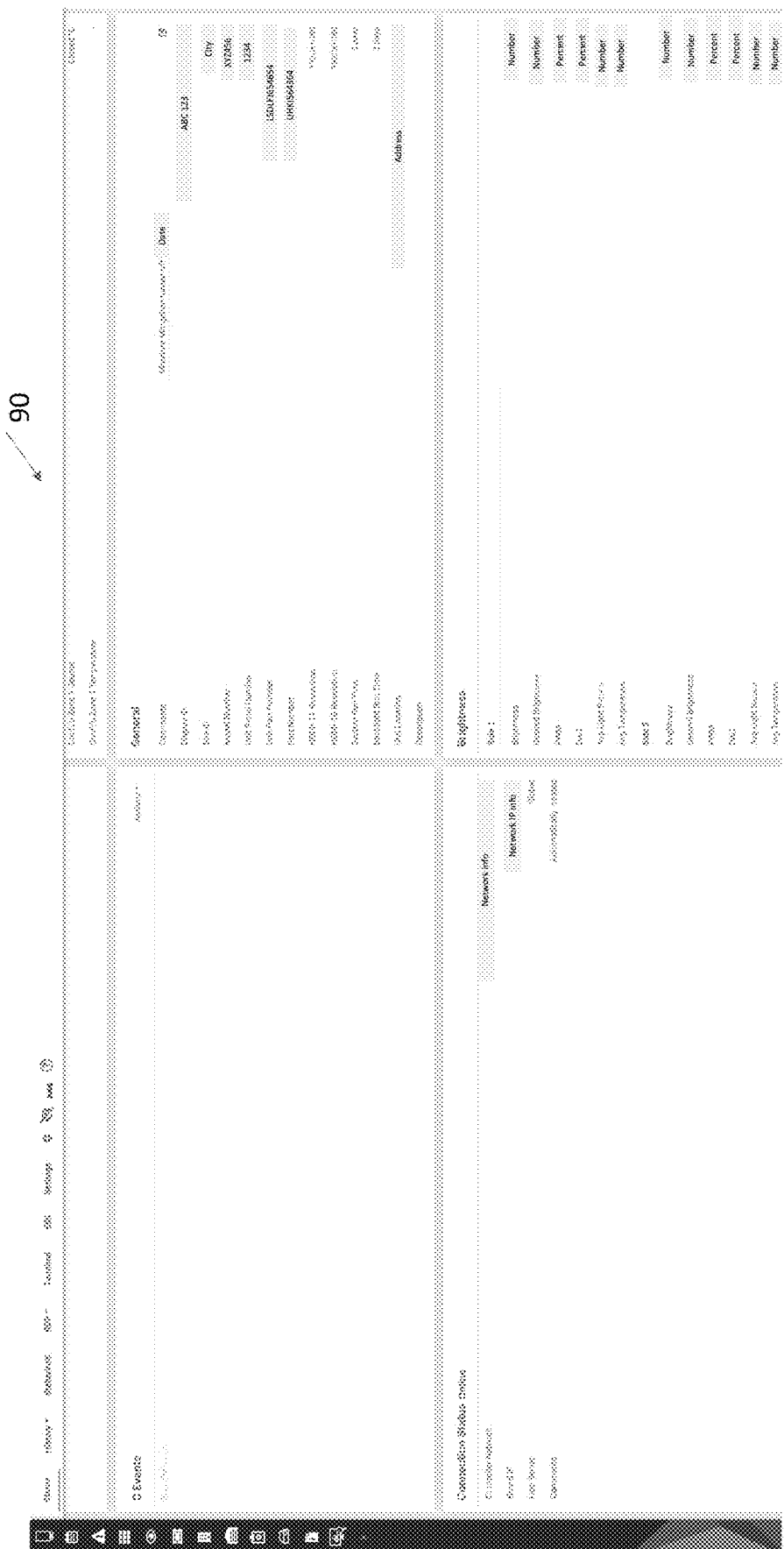
FIG. 14 is a continuation of the user display of FIG. 13.
Figure 15:
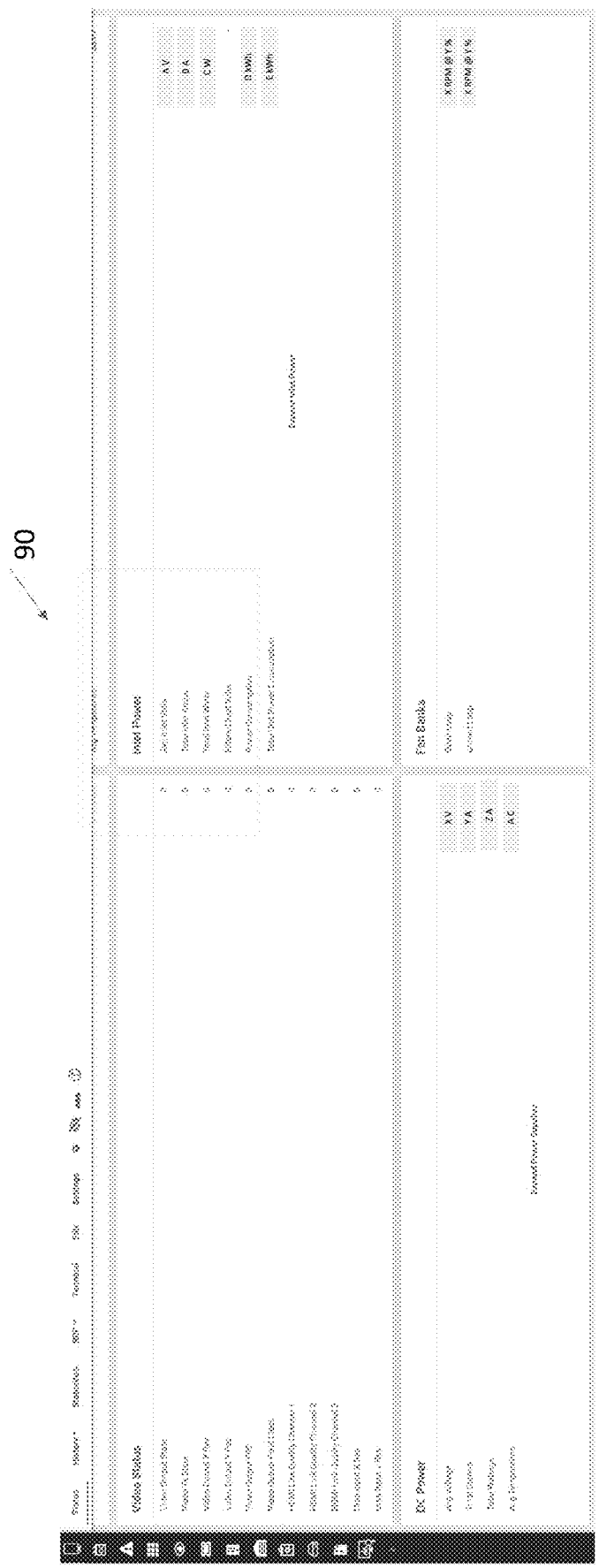
FIG. 15 is a continuation of the user display of FIG. 14.
Figure 16:
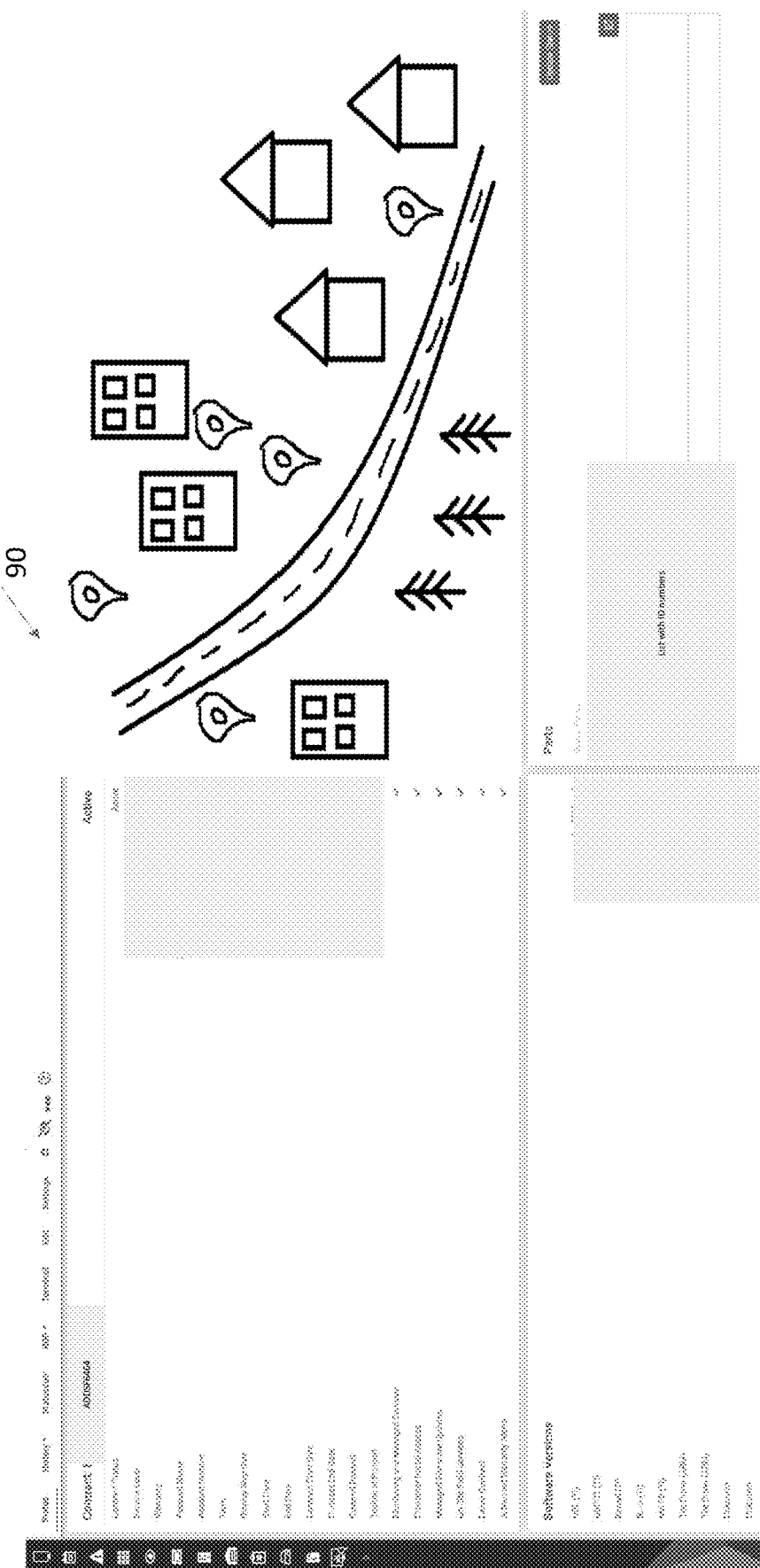
FIG. 16 is a continuation of the user display of FIG. 15.

The user display 90 of FIG. 12 includes data for multiple display assemblies 30 and may include information such as, but not limited to, geographic position, status, total number of units, combinations thereof, of the like.

The user displays 90 of FIGS. 13-16 include data for a single display assembly 30. Such data may be generated upon selection or inputting criteria for a particular display assembly 30, such as but not limited to, serial number, customer identifier, geographic location, combinations thereof, or the like which is sufficient to specify a particular one of the display assemblies 30. Such detailed information may be available by selecting one of the units described in a summary user display 90 such as but not limited to those shown and/or described with regard to FIG. 12.

Figure 17:
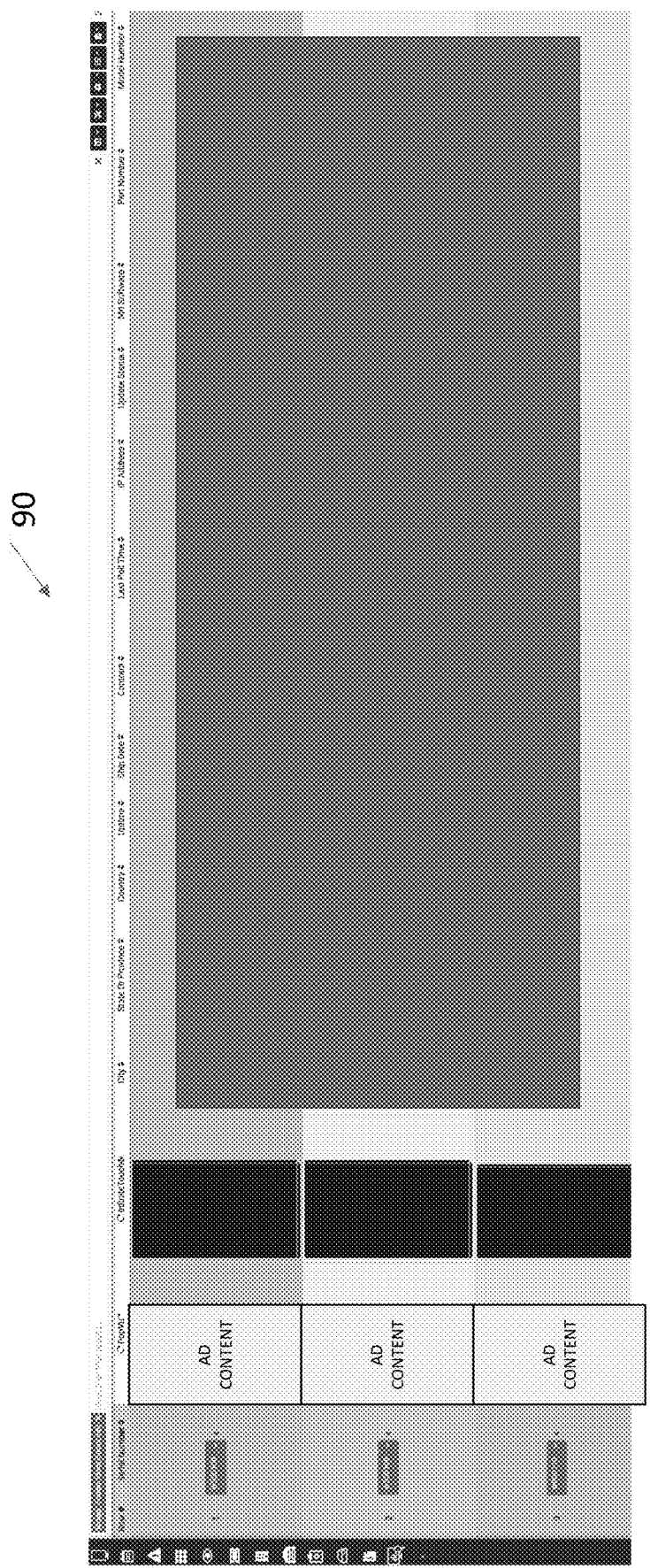
FIG. 17 is another exemplary user display generated by at least the system of FIG. 1.

The user display 90 of FIG. 17 includes current displayed image information and touch interface data, among other data points, for multiple ones of the display assemblies 30.

Figure 18:
FIG. 18 is another exemplary user display(s) generated by at least the system of FIG. 1.

As illustrated in FIG. 18, the user display 90 may include, for example without limitation, identifying information for display assemblies 30 such as but not limited to, part number, model number, IP address information, software version information, location information, city, state or province, unit serial number, country, uptime, contract, last poll time, IP address, update status, software revision, part number, model number, combinations thereof, and the like; status information, such as but not limited to open or closed status information for multiple ones of the electronic displays 70 or related subassemblies and/or access panels (e.g., doors, locks, etc.), magnet and/or latch status; power information, such as but not limited to system power information, including but not limited to direct current (DC) power information, surge, kW/H, efficiency, inputs (voltages, watts, amps; fan information, such as but not limited to fan status information, such as but not limited to fans associated with one or more open loop airflow pathways and/or closed loop airflow pathways, RPM speed, speed or power percentage, combination thereof, or the like; display or backlight information for multiple ones of the display assemblies 30, such as but not limited to backlight status information, such as actual power, desired power, actual luminance, desired luminance, settings for various times of day, temperature information, combinations thereof, or the like; weather information local weather and/or internal relative humidity status information; environmental information; internal temperature information, such as for various components; location (e.g., GPS) information; touch screen status information (touch locations, touch count, frame numbers, temperature information, electrical status information); video status information (e.g., video state, video resolution, frame rate, connection information); display configuration information, such as board time, start up commands, screen information, video input information, test pattern, audio check, humidity check, humidity threshold, pressure check, location check, sensor type, shock sensitivity rating, frame capture orientation, combinations thereof, or the like; network configuration information, such as DHCP state, gateway information, net mask, DNS, server address, proxy address, URL, time zone, weather service, secondary IP, host name, combinations thereof, or the like; power configuration information, such as number of power supplies, min/max voltages, current, power, combinations thereof, or the like; day-to-night and/or night-to-day backlight transition confirmation information, such as time and backlight levels; temperature control configuration information, such as delta temperature change warning thresholds (e.g., ambient, internal), min/max temperature thresholds (e.g., ambient, internal), offsets; uptime statics and other information for multiple ones of the display assemblies 30, such as but not limited to display information (e.g., serial number), geographic information (e.g., address information, site ID), runtime (e.g., percentage) information, play count information, play duration average information (e.g., in second), combinations thereof, and the like; combinations thereof, or the like. All such values or other information are merely exemplary and are not intended to be limiting. The values or other information may be presented in any of the normal associated units, or multiple such units (e.g., converted to/from metric to imperial). The values or other information may be presented for a single unit or multiple ones of the display assemblies 30 and/or various components thereof. The values or other information may be presented in a table, by unit serial number, in condensed or expanded form, summary form, combinations thereof, or the like.

Figure 19:
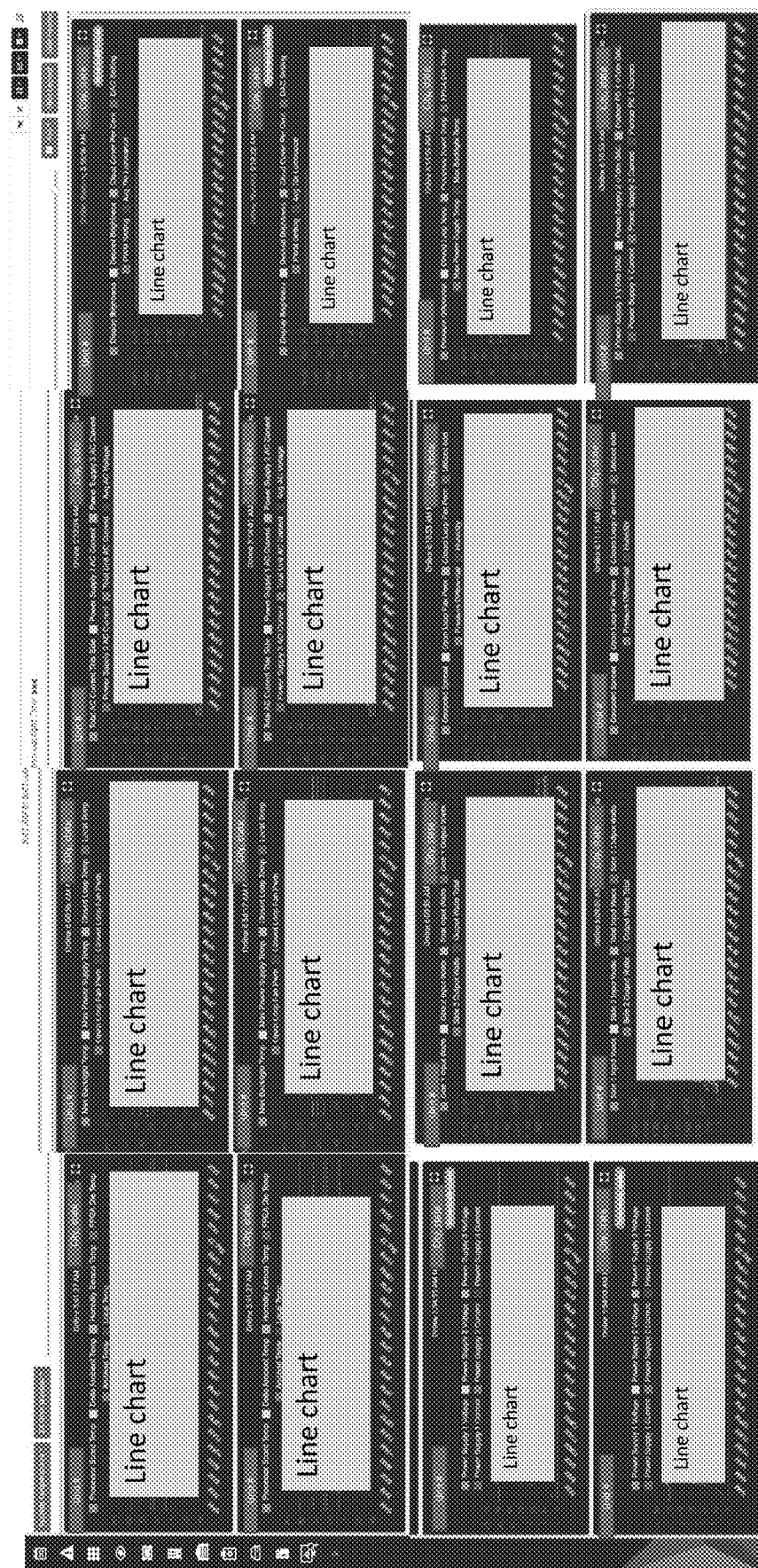
FIG. 19 is another exemplary user display(s) generated by at least the system of FIG. 1.

FIG. 19 illustrates other exemplary user displays 90 comprising exemplary graphical presentations of monitored data points that may be generated. Such visualizations may be generated for particular time periods and/or on a substantially real-time basis, such as to account for time for data transmission and processing. For example, the user display 90 of FIG. 20 illustrates exemplary temperatures, exemplary temperature and fan information, exemplary power inlet information (e.g., alternating current (AC)), exemplary backlight drive and cloud cover information, exemplary power supply (e.g., DC voltages and/or currents), exemplary power input and output information, exemplary humidity information (e.g., dewpoint humidity pressure), exemplary temperature information, exemplary power supply (e.g., DC power supply current share tracking). The information may be provided in line charts, such as with various data points charted in different colors, with different patterns, with different symbols, combination thereof, or the like. Information may be provided for a single unit, or multiple units, such as in individual charts or multiple charts. The type, kinds, and format of information illustrated, including what all is included in a given line chart, is merely exemplary and not intended to be limiting. The information may be plotted or otherwise provided over any length time period, such as but not limited to, 12 hours, 24 hours, 36 hours, etc. The information may be plotted or otherwise provided in substantially real time, or based on historical records. The information may be scaled, filtered, or the like.

The user display 90 of FIG. 20 includes exemplary proof-of-play information, such as in one or more reports, for an exemplary one of the display assemblies 30, which may include, for example without limitation, display information, image information, plays delivered, campaign information, days played information, image thumbnails, combinations thereof, or the like.

Figure 21:
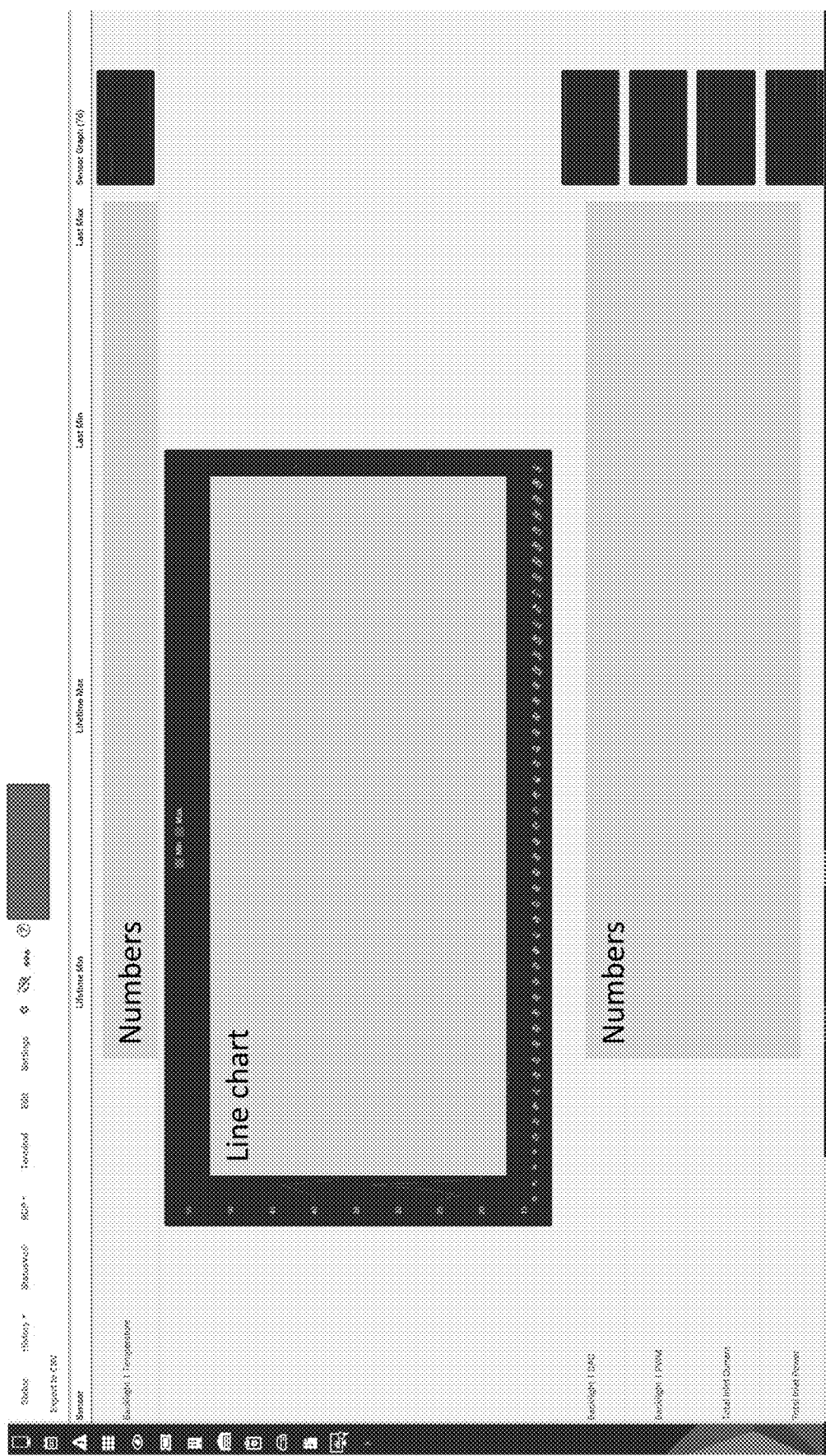
FIG. 21 is another exemplary user display generated by at least the system of FIG. 1.

The user display 90 of FIG. 21 includes exemplary lifetime and daily minimum and maximum operational parameter data displays for an exemplary one of the display assemblies 30. The lifetime and/or daily minimum and maximum operational parameter data displays may be provided for any type and/or kind of data, including but not necessarily limited to, minimum lifetime and/or daily values for various data points, graphical displays of such information, combinations thereof, or the like.

The sensors may comprise, for example without limitation, one or more of temperature sensors, pressure sensors, ambient light sensors, airspeed sensors, power sensors (e.g., electric meters, voltage meters, current meters), combinations thereof, or the like. Any number, type, and/or kind of sensors may be provided for generating the various data points. The components 60 may include the sensors, though such is not required. The sensors may be in electronic communication with the controllers 50. The sensors may be located at, or internal to, the display assemblies 30. Alternatively, or additionally, the sensors may be external to and, remote from, the display assemblies 30. For example, without limitation, some or all of the ambient conditions may be determined from one or more internet-based sources, which may include, for example without limitation, data obtained from one or more local weather sensors. Such data may be received at the controller 50, such as by way of the network communication devices 40.

Some or all of the user displays 90 may be accessible by way of one or more internet-based portals, webpages, applications, combinations thereof, or the like. The user displays 90 may be generated at access, upon navigation to particular ones of the user displays 90, and/or various user selections.

The information displayed and the manner in which it is displayed is merely exemplary and is not intended to be limiting. Any type or kind of data may be displayed in any format.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections described herein may be accomplished by wired or wireless means. The electronic devices, including but not necessarily limited to the electronic storage devices, databases, or the like, may comprise and/or be configured to hold, solely non-transitory signals.

What is claimed is:

1. A system for remotely monitoring electronic display assemblies, said system comprising:

the electronic display assemblies, each comprising a housing, an electronic display, a controller for controlling operations of the electronic display assembly, including at least images displayed at the electronic display, at least one airflow pathway extending through at least part of the housing, sensors within the housing, including one or more temperature sensors located along the at least one airflow pathway, in electronic communication with the controller for monitoring operating conditions of the electronic display assembly, one or more fans located along the at least one airflow pathway and in electronic communication with the controller, and a network communication device in electronic communication with the controller; and a monitoring center comprising one or more electronic storage devices comprising software instructions, which when executed, configure one or more processors to:

receive, from each of the electronic display assemblies, data regarding operations of the electronic display assemblies, including internal temperature readings for the electronic display assemblies from the one or more temperature sensors and fan speed levels for the one or more fans based on data received from the controller;

associate the data received from the electronic display assemblies with unit identifiers such that the data received from different ones of the electronic display assemblies is associated with different ones of the unit identifiers;

receive input defining a population of the electronic display assemblies;
identify a subset of the unit identifiers for the electronic display assemblies of the population;
identify the data associated with the unit identifiers in the subset; and
generate one or more user displays with the identified data comprising time dependent graphs of at least some of the identified data, on an electronic display assembly specific basis, including at least some of the internal temperature readings and at least some of the fan speed levels for each of the electronic display assemblies of the population.

2. The system of claim 1 wherein:
the sensors comprise ambient light sensors;
the electronic display of each of the electronic display assemblies comprises a backlight; and
said data received from the electronic display assemblies comprises ambient light level readings from the ambient light sensors, and backlight power levels for the backlight based on data from the controller.

3. The system of claim 2 wherein:
said data received from the electronic display assemblies further comprises power consumption information for each of the electronic display assemblies based on data received from the controllers of the electronic display assemblies.

4. The system of claim 1 wherein:
each of the electronic display assemblies is associated with a different one of the unit identifiers; and
said one or more electronic storage devices comprise additional software instructions, which when executed, configure said one or more processors to associate all of the portions of the data received from a respective one of the electronic display assemblies with the respective one of the unit identifiers.

5. The system of claim 4 wherein:
each of the unit identifiers comprises a unique serial number.

6. The system of claim 1 wherein:
association of said data received from the electronic display assemblies with said unit identifiers, identification of the subset of the unit identifiers for the electronic display assemblies of the population, and identification of the data associated with the unit identifiers in the subset is carried out by one or more micro-services.

7. The system of claim 1 wherein:
the monitoring center is in electronic communication with at least one remote device and is configured to receive said input defining the population from the at least one remote device and generate the one or more user displays at the at least one remote device.

8. The system of claim 1 wherein:
the data is electronically compartmentalized at said one or more electronic storage devices by the unit identifiers; and
said one or more electronic storage devices comprise additional software instructions, which when executed, configure said one or more processors to receive and verify login information prior to generating said one or more user displays with the identified data.

9. The system of claim 1 wherein:
said one or more electronic storage devices comprise additional software instructions, which when executed, configure said one or more processors to cause all of the portions of the data assigned the particular one of the unit identifiers to be summarized into a summary report; and
said one or more user displays comprise said summary report.

10. The system of claim 1 wherein:
said data comprises geographic information stored in association with said unit identifiers for each of said electronic display assemblies;
said input defining the population comprises geographic area parameters; and
said one or more electronic storage devices comprise additional software instructions, which when executed, configure said one or more processors to identify the subset of the unit identifiers for the electronic display assemblies of the population, at least in part by identifying the unit identifiers associated with the geographic information fitting the geographic area parameters.

11. The system of claim 1 wherein:
said data comprises customer information stored in association with said unit identifiers for each of said electronic display assemblies;
said input defining the population comprises customer identification parameters; and
said one or more electronic storage devices comprise additional software instructions, which when executed, configure said one or more processors to identify the subset of the unit identifiers for the electronic display assemblies of the population, at least in part by identifying the unit identifiers associated with customer identifiers fitting the customer identification parameters.

12. The system of claim 1 wherein:
said one or more electronic storage devices comprise additional software instructions, which when executed, configure said one or more processors to:
receive operating instructions for the population; and
transmit said operating instructions to the electronic display assemblies associated of the population.

13. The system of claim 12 wherein:
said operation instructions comprise one or more of fan speed instructions and backlight level instructions.

14. The system of claim 1 wherein:
each of said electronic display assemblies comprise a liquid crystal type display;
said monitoring center comprises a dedicated physical facility remote from the display assemblies; and
the data comprises operational status information for each of said electronic display assemblies provided in substantially real time.

15. A system for remotely monitoring electronic display assemblies and providing population specific information, said system comprising:
the electronic display assemblies, each comprising a housing, a first airflow pathway forming a loop within the housing, a second airflow pathway extending from an ambient environment through at least part of the housing, and internal components, said internal components comprising: an electronic display, a controller, sensors, including at least one temperature sensor located along the airflow pathway, fans, at least one of which is located along the first airflow pathway and at least one other of which is located along the second airflow pathway, and a network communication device, wherein said controller is configured to control operations of at least the electronic display and the fans; and a remote monitoring center comprising one or more electronic storage devices comprising software instructions, which when executed, configure one or more processors to:
  associate geographic information and customer information with unique unit identifiers for each of the electronic display assemblies;
  receive, from the electronic display assemblies, data regarding operations of the electronic display assemblies, including data received from the sensors regarding internal operating conditions, including internal temperature readings from the at least one temperature sensor, and data received from the controller regarding operating status of at least the electronic display and the fans, including information regarding illumination levels of the electronic display and speed levels of the fans;
  associate the data received from the electronic display assemblies with the unique unit identifiers such that the data received from different ones of the electronic display assemblies are assigned different ones of the unique unit identifiers;
  receive input from a remote electronic device comprising population parameters for the electronic display assemblies, said population parameters comprising at least one of a geographic parameter and a customer parameter;
  identify a subset of the unique unit identifiers for the electronic display assemblies fitting the population parameters;
  identify the portions of the data associated with the unique unit identifiers in the subset; and
  transmit data for generating time dependent graphs, separately for each of the electronic display assemblies in the subset, with at least some of the identified data at the remote electronic device, including a first time-dependent graph of at least a portion of the internal temperature readings, a second time-dependent graph of at least a portion of the fan speed information, and a third time-dependent graph for at least some of the illumination levels of the electronic display.

16. The system of claim 2 wherein:
the time dependent graphs comprise line charts; and
the controller is configured to separately indicate data at said line charts for each of said sensors.

17. The system of claim 16 wherein:
at least one of said line charts comprise multiple, separate lines, each indicating data from a respective one of said sensors.

18. The system of claim 17 wherein:
each of the fan speed levels for the fans, the ambient temperature readings, the ambient light level readings, and the backlight power levels are separately indicated at said line charts.

19. A system for remotely monitoring electronic display assemblies, said system comprising:
  the electronic display assemblies, each comprising a controller, sensors in electronic communication with the controller, and a network communication device in electronic communication with the controller; and
  a monitoring center comprising one or more electronic storage devices comprising software instructions, which when executed, configure one or more processors to:
    receive, from each of the electronic display assemblies, data regarding operations of the electronic display assemblies;
    associate the data received from the electronic display assemblies with unit identifiers such that the data received from different ones of the electronic display assemblies is associated with different ones of the unit identifiers, wherein the data is electronically compartmentalized at said one or more electronic storage devices by the unit identifiers; and
    receive and verify login information, and following successful verification:
      receive input defining a population of the electronic display assemblies;
      identify a subset of the unit identifiers for the electronic display assemblies of the population;
      identify the data associated with the unit identifiers in the subset; and
      generate one or more user displays with the identified data.

* * * * *